(12) United States Patent
Gershenfeld et al.

(10) Patent No.: US 8,986,809 B2
(45) Date of Patent: Mar. 24, 2015

(54) METHODS AND APPARATUS FOR DIGITAL COMPOSITES

(75) Inventors: Neil Gershenfeld, Somerville, MA (US); Kenneth Cheung, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 468 days.

(21) Appl. No.: 13/277,103

(22) Filed: Oct. 19, 2011

(65) Prior Publication Data

US 2012/0094060 A1 Apr. 19, 2012

Related U.S. Application Data

(60) Provisional application No. 61/394,713, filed on Oct. 19, 2010.

(51) Int. Cl.
| | |
|---|---|
| *B32B 3/06* | (2006.01) |
| *B23P 11/00* | (2006.01) |
| *B64C 1/08* | (2006.01) |
| *B32B 5/12* | (2006.01) |
| *B32B 5/26* | (2006.01) |

(52) U.S. Cl.
CPC ... *B64C 1/08* (2013.01); *B32B 5/12* (2013.01); *B32B 5/26* (2013.01)
USPC .............................................. 428/99; 428/98

(58) Field of Classification Search
CPC ................ B32B 5/12; B32B 5/26; B64C 1/08
USPC ..................................................... 428/99, 98
See application file for complete search history.

(56) References Cited

U.S. PATENT DOCUMENTS

| | | | |
|---|---|---|---|
| 2,314,949 A | 3/1943 | Palmer | |
| 2,380,336 A | 7/1945 | Schwebel | |
| 3,005,282 A | 10/1961 | Christiansen | |
| 4,009,543 A | 3/1977 | Smrt | |
| 4,593,514 A | 6/1986 | Smith | |
| 5,398,472 A | 3/1995 | Eichelkraut | |
| 6,336,269 B1 | 1/2002 | Eldridge et al. | |
| 7,625,261 B2 | 12/2009 | Andersen | |
| 2003/0146346 A1* | 8/2003 | Chapman, Jr. ................ | 244/123 |
| 2008/0220112 A1 | 9/2008 | Waldrop et al. | |
| 2009/0030501 A1 | 1/2009 | Morris et al. | |
| 2010/0018420 A1 | 1/2010 | Menard | |
| 2014/0037873 A1* | 2/2014 | Cheung et al. ............... | 428/34.1 |

OTHER PUBLICATIONS

International search report and written opinion of international searching authority, dated May 21, 2012, PCT/US11/56961, international filed Oct. 19, 2011.

* cited by examiner

*Primary Examiner* — Brent O'Hern
(74) *Attorney, Agent, or Firm* — Norma E. Henderson

(57) ABSTRACT

In exemplary implementations of this invention, a digital material comprising many discrete units is used to fabricate a sparse structure. The units are reversibly joined by elastic connections. Each unit comprises fiber-reinforced composite material. Each unit is small compared to the sparse structure as a whole. Likewise, in a sparse structure made from this digital material, the number of types of units is small compared to the total number of units. The digital material is anisotropic. This anisotropy may be due to different fiber orientations within each unit. Furthermore, different units in a single sparse structure may be oriented in different directions and in different, non-parallel planes. In some cases, the digital material is reinforced with carbon fibers, and connections between units are stronger than the units themselves. The small discrete units may be assembled into a strong, lightweight sparse structure, such as an airframe.

16 Claims, 35 Drawing Sheets

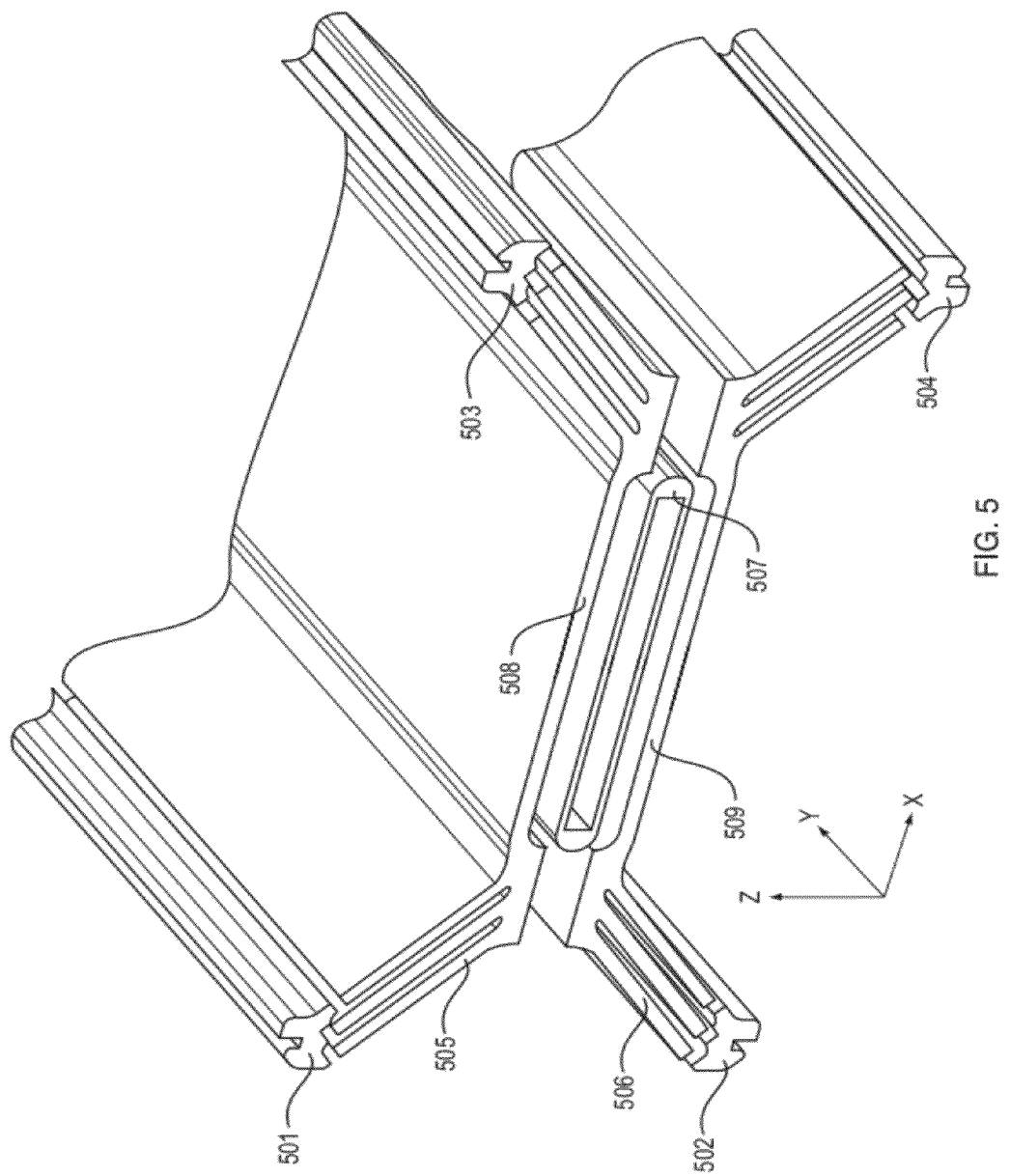

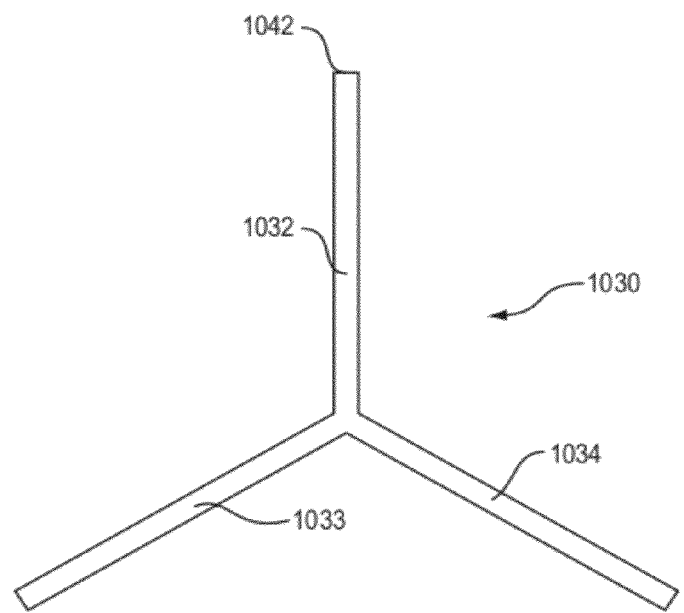
FIG. 10C
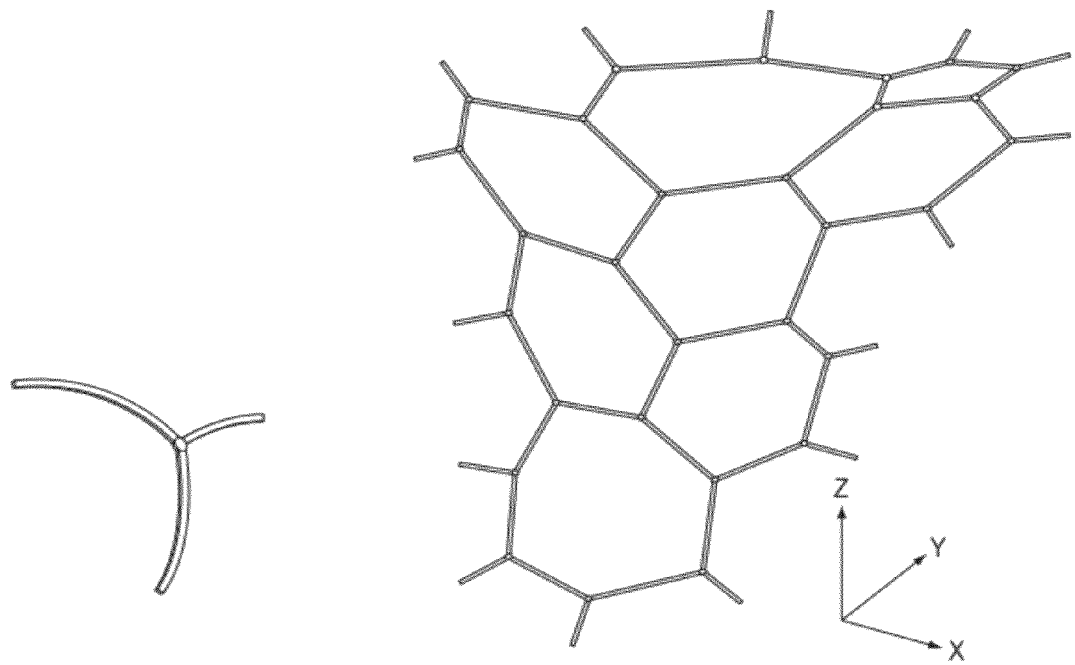
FIG. 10D
FIG. 10E

METHODS AND APPARATUS FOR DIGITAL COMPOSITES

RELATED APPLICATIONS

This application claims the benefit of U.S. Provisional Application Ser. No. 61/394,713, filed Oct. 19, 2010, the entire disclosure of which is herein incorporated by reference.

STATEMENT REGARDING FEDERALLY SPONSORED RESEARCH OR DEVELOPMENT

This invention was made with U.S. government support under Grant Number W911NF-08-1-0254, awarded by the Army Research Office. The government has certain rights in this invention.

FIELD OF THE TECHNOLOGY

The present invention relates generally to composite materials.

SUMMARY

In exemplary implementations of this invention, a digital material comprising many discrete units is used to fabricate a sparse structure. The units are reversibly joined by elastic connections. The connections allow force to be transferred among linked units. Each unit comprises fiber-reinforced composite material. Each unit is small compared to the sparse structure as a whole. Likewise, in a sparse structure made from this digital material, the number of types of units is small compared to the total number of units.

In exemplary implementations, the digital material is anisotropic. This anisotropy may be due to different fiber orientations within each unit. For example, at least some of the units may be laminates. In these laminates, there may be multiple layers, with fibers oriented in different directions in different layers. Or, for example, fibers in a single unit may be laid out with different orientations (e.g., in some elongate units with holes in them, some fibers may run around a hole, and other fibers may run the length of the unit). Furthermore, different units in a single sparse structure may be oriented in different directions and in different, non-parallel planes.

In some implementations, the digital material is reinforced with carbon fibers.

The small discrete units may be assembled into a very strong, very lightweight sparse structure, such as a structural element for an aircraft. This approach is contrary to a current trend in aircraft manufacture, which is to build large, monolithic parts made of composite materials. Conventionally, monolithic parts are preferred over parts comprised of many small discrete units, because of assembly complexity without robotic assemblers and existing structural analysis and simulation paradigms. Further, conventionally the connections between the discrete units are thought of as weaker than the units themselves, creating weak links that can fail when loaded.

However, in exemplary implementations of the present invention, connections between units may be stronger than the units themselves. This allows a sparse structure made of many discrete units to be as strong as if it were made of a single monolithic part. A cost of this approach is extra mass density, compared to the mass density if a single monolithic structure of the same sparse geometry is employed. The latter is not conventionally used because of assembly complexity. When made from many discrete units, strengthening the connections (between the small units) requires extra weight and extra room. These can be accommodated by a sparse geometry, which has plenty of empty space and tends to be lightweight. For applications with distributed loading, such as aircraft wing structures, sparse structures can meet strength requirements at lower mass densities than conventional aerostructures made (conventionally) from relatively few monolithic parts. This is because there is extra material in the conventional constructions that is required to redistribute loads onto the few monolithic parts. The extra mass density cost of connections in the digital material approach can meet or be less than the extra mass density cost of load redistribution in conventional constructions.

In exemplary implementations, the shape (and the functional material properties) of the sparse structure can be tuned. Tuning may be achieved by, for example, introducing voids, varying parts ratios and varying geometry.

In exemplary implementations, the sparse structure is elastically deformable. For example, the sparse structure may include many small and simple actuators that together perform enough work to result in large elastic deformations of the structure.

Or, for example, when the sparse structure is loaded, a reversible deformation (or reversible dislocation) of a lattice in the sparse structure may occur. This reversible deformation (or reversible dislocation) may be due, at least in part, to a reversible change in at least some of the positions at which connections between units exist, in response to loading. For each of these changes in position of a connection, the connection disconnects at one location on a unit and then reconnects at another location on that unit or another unit.

In exemplary implementations, deformation (or dislocation) may be designed and may be anisotropic based on the pattern of assembly of the elements.

In some implementations, a unit transfers axial load to other units that are connected to, and aligned orthogonally to, that unit.

In some implementations, at least some of the units are compression units. Each of the compression units is adapted to elastically deform further, from its unloaded state, in response to compressive loading than to tension loading.

In some implementations, at least some of the units are tension units. Each of the tension units is adapted to elastically deform further, from its unloaded state, in response to tension loading than to compressive loading.

In some implementations, a sparse structure is assembled, unit by unit, by snapping the longitudinal end of one unit, or the longitudinal ends of multiple units, into a notch in another unit, which notch has a chamfered edge.

In some implementations, the sparse structure comprises multiple substructures. Each substructure includes three units that are of equal length and are connected by a node. For example, in a prototype, each substructure comprises three units that are of equal length. The long axis of each unit in the substructure may be a straight line, or may be curved (e.g., similarly to how the seams of a soccer ball are curved). The substructures may be pre-loaded when attached to the sparse structure, causing the units in the substructures to bend.

In some implementations, the sparse structure defines a curved surface.

In some implementations, the sparse structure defines a highly porous surface or highly porous volume.

In some implementations, an elastic connection between the units is formed by using a compression clip to clip together longitudinal ends of five units, four of the five units being aligned in a plane that is orthogonal to the long dimension of the fifth of the five units.

In some implementations, the sparse structure is frangible. In this case, the sparse structure is adapted to disintegrate, without exceeding the elastic limits of the units in the structure, upon a collision with another object. For this to occur, the elastic limits of only the connections are exceeded.

In some implementations, the assembly of the discrete units into a sparse structure is automated. The assembly devices may be smaller than the sparse structure being assembled. For example, the digital units may be assembled into a sparse structure using massively parallel robotic assembly. Or, for example, in an automated assembly process, some of the elastic connections between the units may be created by snapping units into place. To do so, an assembler device pushes a unit against a partially assembled sparse structure to snap the unit into place. The assembler device may move with one degree of freedom when it pushes the unit. Alternately, for a structure comprising pinned units, in order to add a new pinned unit, an assembler device may remove pins, attach the new pinned unit, and reattach the pins In some cases, the automated assembly process is controlled by a computer algorithm.

In some implementations, due to elastic averaging, assembly of the units produces a sparse structure with tolerances, for the entire structure, that are more precise than the tolerances of the individual units that comprise the structure.

In exemplary implementations, the digital material has many benefits, such as: (a) reconfigurability, (b) error correction, and (c) scalability. A digital material may have a longer service life, because individual units may be replaced. For example, mobile units travel over the structure to replace damaged units or adapt the structure to new requirements. The digital material may allow for highly porous large scale volumetric assemblies that can still contain components that are extrinsic to the structure, such as aircraft structures.

An important advantage of this invention, in exemplary implementations, is spatial structural redundancy. Industry conventionally looks to make structures out of as few parts as possible, but this means that a single failure (or very low number of failures) will result in total system failure. In contrast, in exemplary embodiments of this invention, highly repetitive volumetric structures may be used for applications with distributed loading (buildings, aircraft, and bridges). If subjected to localized stress on a part of the structure (e.g., from a neighboring building in an earthquake, from a bird strike, or from a car/truck accident), the structure may suffer localized damage that does not affect the overall structural integrity as much as would be the case with a conventional design.

Currently, in the aerospace industry, it is difficult to join composites and to repair them. In contrast, in exemplary implementations of the present invention, the structure comprises units made of composite material, which units are linked by multiple redundant force pathways, and repair is facilitated by the fact that the units are easily replaceable.

In exemplary implementations of this invention, digital material is assembled into space-filling sparse volumes. This is in contrast to conventional construction with spars, ribs, and skins (In some cases, however, this invention may be implemented as a sparse structure covered at least in part by a skin).

The above description of the present invention is just a summary. It is intended only to give a general introduction to some illustrative implementations of this invention. It does not describe all of the details of this invention. This invention may be implemented in many other ways.

BRIEF DESCRIPTION OF THE DRAWINGS

FIG. 5 shows bonded parts of a pultrusion.

FIG. 10C shows a different example of such a unit.

FIG. 10D shows a substructure with curved arms.

FIG. 10E shows a portion of a sparse structure, assembled from substructures, each node being connected with struts to three other nodes.

The above Figures illustrate some illustrative implementations of this invention, or provide information that relates to those implementations. However, this invention may be implemented in many other ways. The above Figures do not show all of the details of this invention.

DETAILED DESCRIPTION

The following is a description of some exemplary implementations of this invention:

In exemplary implementations of this invention, digital composites allow rapid prototyping of fiber composite parts with high throughput robotic digital assemblers. The individual components are small in comparison to the finished assemblies, and may be produced through conventional means, as suited for mass production of identical parts.

The term "digital material" or "digital composite", as used herein, means a material comprising many discrete units, which units comprise composite material reinforced with anisotropic fibers.

Natural lattice features—such as the ability to dynamically respond to loading with the formation of dislocations—can be designed into digital material structures. For example, this dynamic response may be implemented using secondary connection positions or self detachment and reattachment of connections.

The use of many smaller parts to assemble a large part allows the use of elastic averaging to reduce error in manufacturing methods. When many parts are used to locate a single feature, with enough elastic compliance to adjust to small inconsistencies in the location of the feature, the effective location of the feature will be the average of the individual locations provided by the individual parts. When this process is performed correctly, this average location will be more precise than the process used to fabricate the individual parts. This method relies on this original per-part error being within a certain threshold for a given system. By the same rules, when forces are effectively distributed throughout an assembly of smaller parts, tolerances on strength requirements may be effectively reduced as the observed bulk strength of the assembly will be a result of this force distribution. This is allowed by the elasticity that is common to fiber reinforced polymer composites, whereby weaker components can be designed to display elastic compliance that transfers load through stronger components.

Figure 1A:
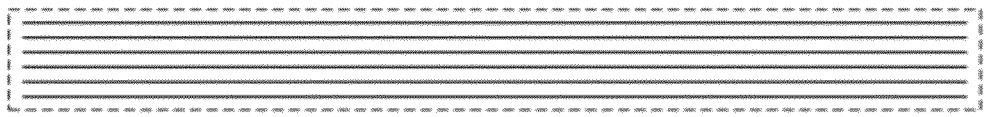
FIG. 1A shows a unit that comprises fiber-reinforced composite material.
Figure 1B:
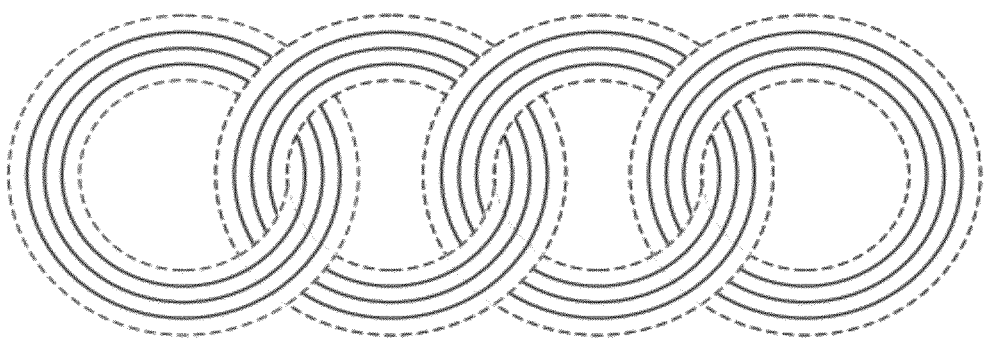
FIG. 1B shows units of this type, linked in a chain.
Figure 1C:
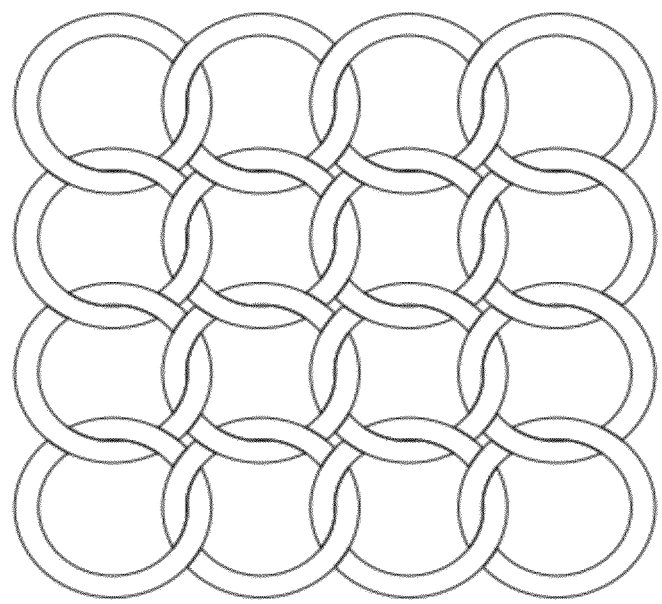
FIG. 1C shows units of this type, linked to form a surface.
Figure 1D:
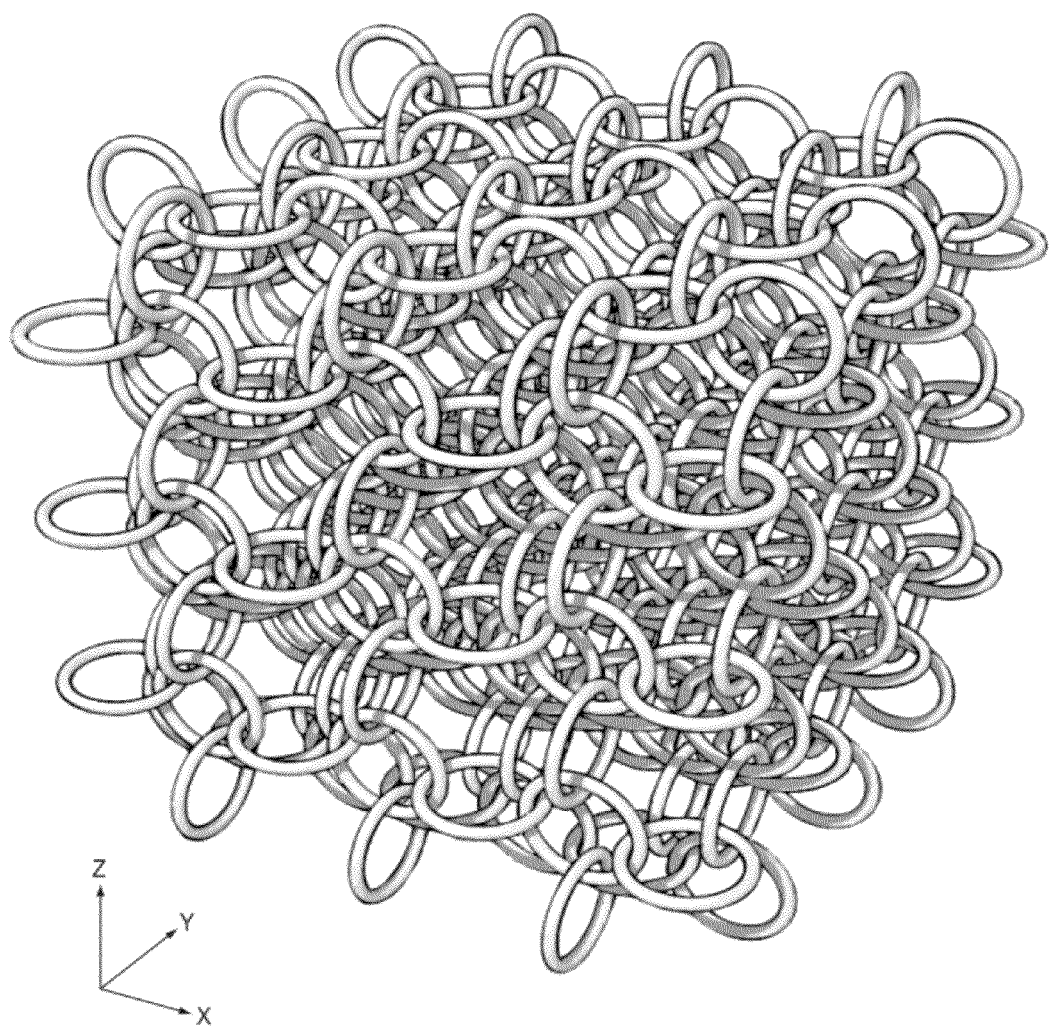
FIG. 1D shows units of this type, linked to form a volumetric structure.

Structures may be assembled by linking units that are individually tuned through their fiber layup, so that forces are transferred between the units, rather than having continuous fibers span entire macro-structures. FIG. 1A shows a unit that comprises fiber-reinforced composite material. FIG. 1B shows units of this type, linked in a chain. FIG. 1C shows units of this type, linked to form a surface. FIG. 1D shows units of this type, linked to form a volumetric structure.

Precise spatial distribution of parts for a given structural shape may be automatically accomplished through algorithmic distribution throughout a prescribed volume, according to external constraints provided (i.e. via finite element analytical tools). Strategies for tuning of mechanical properties include introducing voids, varying part ratios, and varying core geometry.

A wide range of fibers and polymers may be employed in the fiber-reinforced composite material.

Continuous structures may be assembled from relatively small, simple, and discrete units, with a low number of types of units, which makes them good candidates for trivial adaptation to various processes for various fibers and polymers at any scale.

Reversible interlocking assembly allows deconstruction and reuse of individual components. In addition, service life of larger assemblies can be greatly increased by the ability to selectively replace small portions of a structure. This may be performed without significantly impacting the strength of the overall structure, during the replacement process.

In some cases, the structure that is being manufactured may be employed as part of sensing and monitoring equipment. For example, structural carbon fiber may be employed as strain gauges, heating elements, and/or temperature detectors. Interfaces between units may set up to couple to each other, either conductively (e.g. through metallic connectors or carbon fiber) or electromagnetically.

On cases where the part material itself is integrated into sensing devices, additional active sensing properties may be employed. For example, uses include strain sensing, interconnect and composite delamination failure sensing (health monitoring), and even computational logic.

At very high resolutions for a given structure, digital materials can form seemingly continuous shapes. Additionally, hierarchically scaled part types allow for adjusting of resolution as necessary. Still, interfacing parts may be added if extremely smooth outer surfaces are desired (i.e. for aerodynamic reasons).

Example 1

Snap-Fit Digital Composite Volume

In an exemplary embodiment of this invention, called the Snap Fit Digital Composite Volume, a continuous structure of discrete units fills a volume, whereby units are distributed across a three dimensional lattice.

Figure 2A:
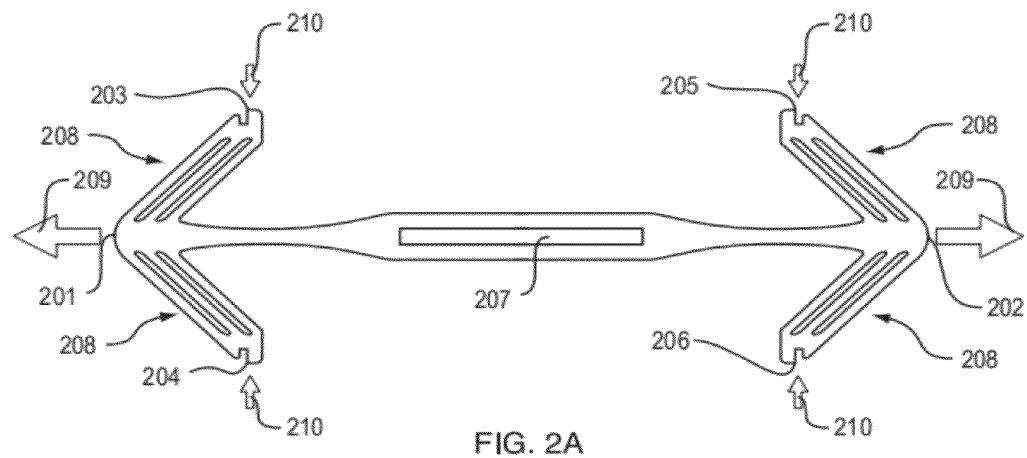
FIG. 2A shows a tension unit.
Figure 2B:
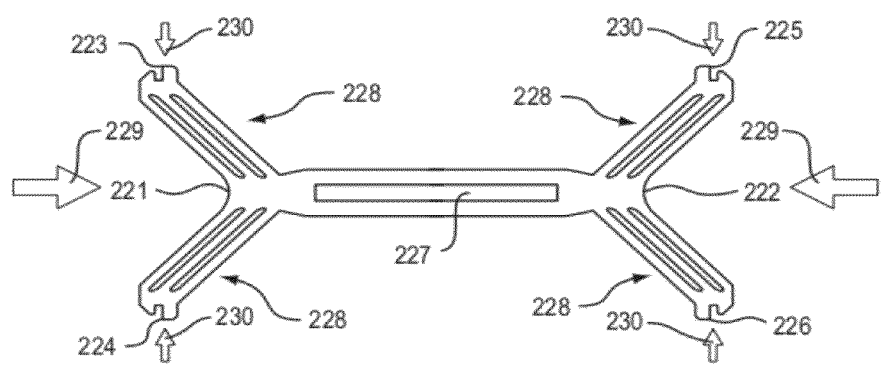
FIG. 2B shows a compression unit.

FIGS. 2A and 2B show compatible tension and compression components that can be used to assemble a tuned Snap Fit Digital Composite Volume.

The geometry of the load transfer mechanisms defines their function as a tension or compression component. FIG. 2A shows an example of a compression unit;

FIG. 2B shows an example of a tension unit. Tension loading is indicated by arrows 209 in FIG. 2A; compressive loading is indicated by arrows 229 in FIG. 2B.

These compression units and tension units are carbon fiber epoxy composite parts with flexural locking mechanisms, requiring snap-fit preload for new parts only required at the normal to the already built structure. To add to a part, new pieces are pushed onto the outside of the structure, which allows an automated assembly mechanism to have a single degree of freedom for the procedure of installing a new part. In addition, the design transfers axial load on components to orthogonal neighboring elements.

Each compression unit and each tension unit includes flexural locking mechanisms and load transfer mechanisms, which are described in further detail, below.

The flexural locking mechanisms comprise elastically compliant flexures (208, 228) with locking notches at their terminal ends (203, 204, 205, 206, 223, 224, 225, 226). These notches have chamfered outside edges, allowing the end of one unit (e.g., 201) to snap into the keyhole (e.g., 227) of another unit, as shown in more detail in FIGS. 7A, 7B and 7C. The keyhole (207, 227) allows two units (one from either direction) to be simultaneously locked in. For simplicity, this design allows these two units to enter side-by-side.

The load transfer mechanisms utilize the same armatures as the flexural locking mechanisms, loaded axially along the primary longitudinal axis (which intersects 201, 202 in FIGS. 2A and 221, 222 in FIG. 2B) (instead of transversely, as when locking or unlocking units). Natural loading of this digital composite structure using these components will only result in axial loading of the individual components. The transverse forces required to assemble and disassemble structures (indicated by arrows marked 210 in FIGS. 2A and 230 in FIG. 2B) need to be provided by an external device, such as a robotic digital assembler.

Consider the tension unit shown in FIG. 2A: When tension-loaded along the primary longitudinal axis (which intersects 201, 202), and subjected to normal forces on its terminal ends (203, 204, 205, 206) (which normal forces are along the same lines as arrows 210, respectively, but opposite in direction to arrows 210, respectively, and are in each case transmitted through the keyhole of an interlocked neighbor of the tension unit), the flexural arms (208) will provide a cam-like action, transferring load to its orthogonal interlocked neighbors.

Similarly, consider the compression unit shown in FIG. 2B: When compression-loaded along the primary longitudinal axis (which intersects 221, 222), and subjected to normal forces on its terminal ends (203, 204, 205, 206) (which normal forces are along the same lines as arrows 210, respectively, but opposite in direction to arrows 210, respectively, and are in each case transmitted through the keyhole of an interlocked neighbor of the tension unit), the flexural arms (228) will provide a cam-like action, transferring load to its orthogonal interlocked neighbors.

Figure 3A:
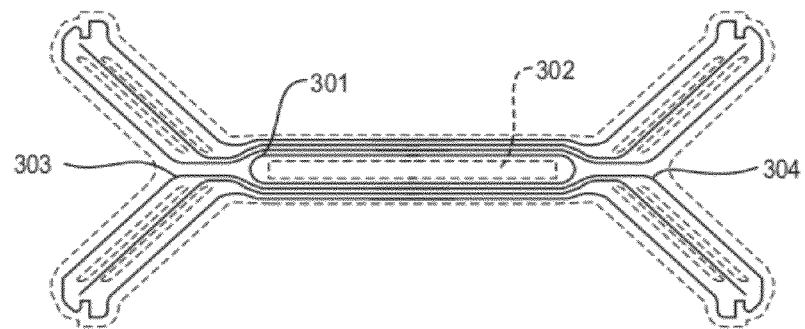
FIG. 3A shows fiber orientations in a compression unit.
Figure 3B:
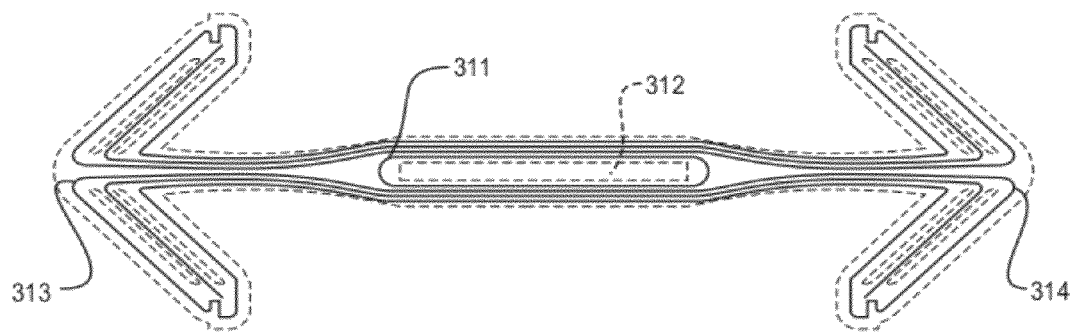
FIG. 3B shows fiber orientations in a tension unit.

FIGS. 3A and 3B are diagrams that show examples of fiber continuity and orientation for these parts. Note the loop of fibers 301, 311 around the keyhole feature (302, 312), and the end-to-end continuity of fibers that extend into the flexure and load transfer armature (such as the fiber that extends from 303 to 304, or the fiber that extends from 313 to 314).

Figure 4:
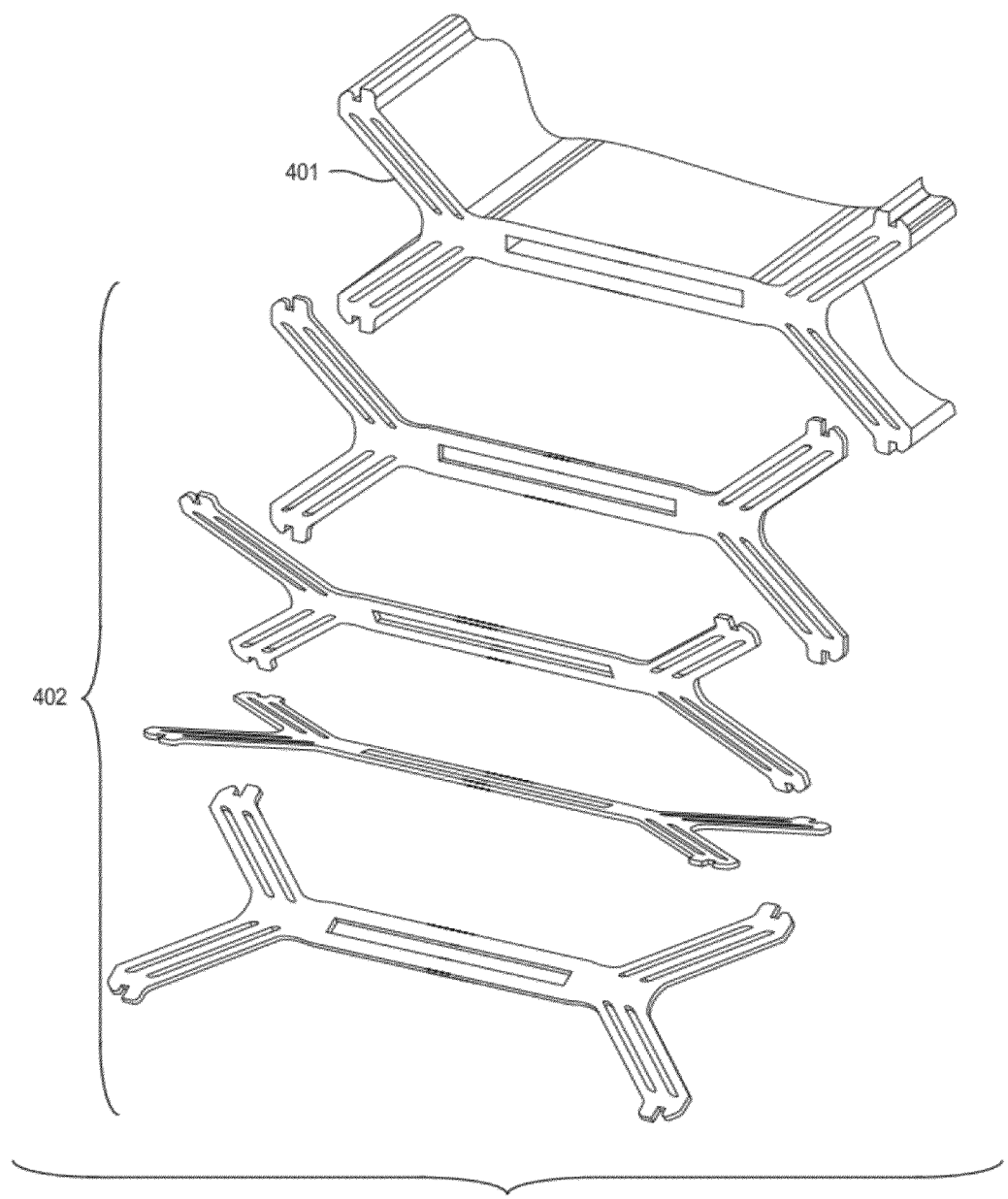
FIG. 4 shows a pultrusion that is sliced to form units.

Production of the parts may be via conventional resin transfer molding or pultrusion and slicing. FIG. 4 illustrates a pultrusion 401 that is sliced into compression units 402. Given the fiber continuity and orientation shown in FIG. 3A, the pultrusion process may be made simpler by producing interlocking end caps (501, 502, 503, 504), main body (508, 509) and flexure armatures (e.g., 505, 506), and a keyhole component (507) as separate pieces to be bonded together before slicing.

Figure 6B:
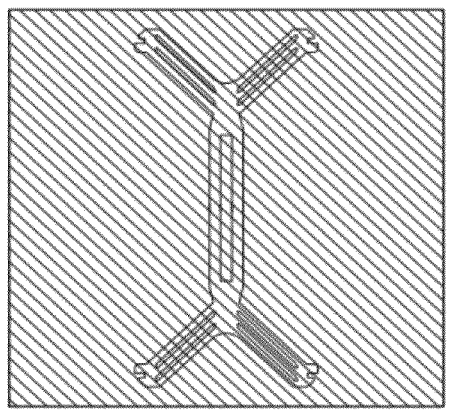
FIGS. 6A through 6D show a compression unit comprising a laminate material.
Figure 6D:
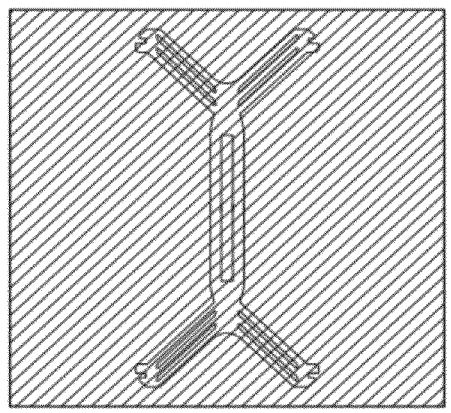
Figure 6A:
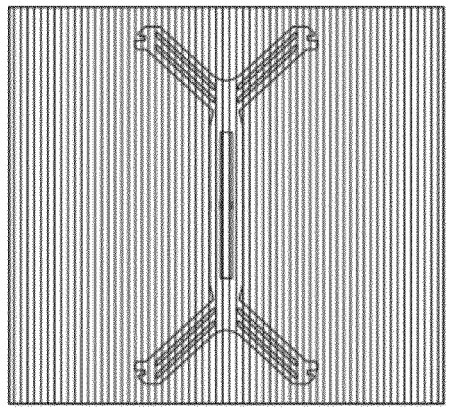
Figure 6C:
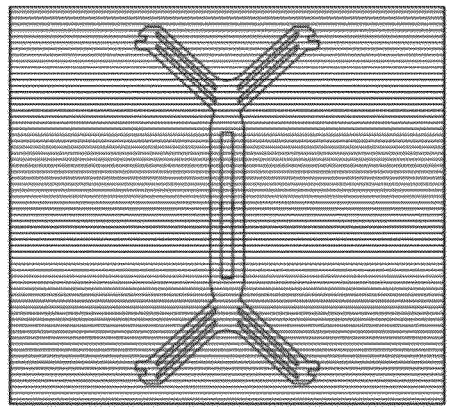
Figure 6F:
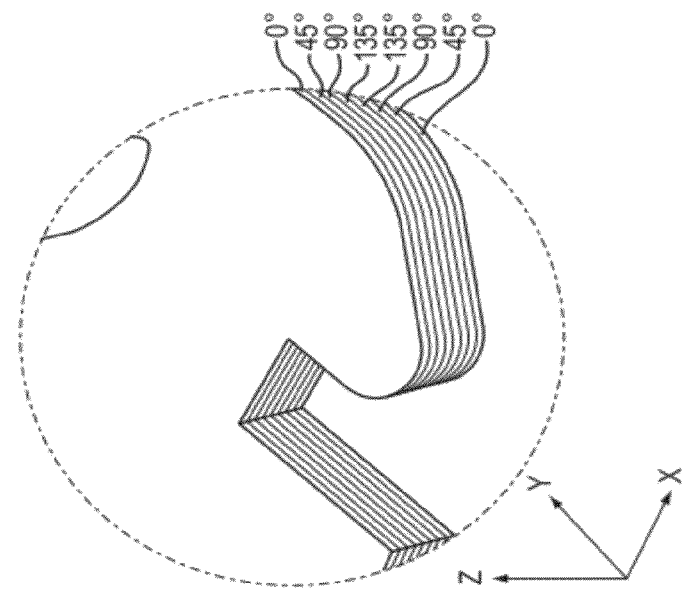
FIGS. 6E through 6F show a detailed view of a part of the compression unit, in which the fiber orientation varies in different layers of the laminate.
Figure 6E:
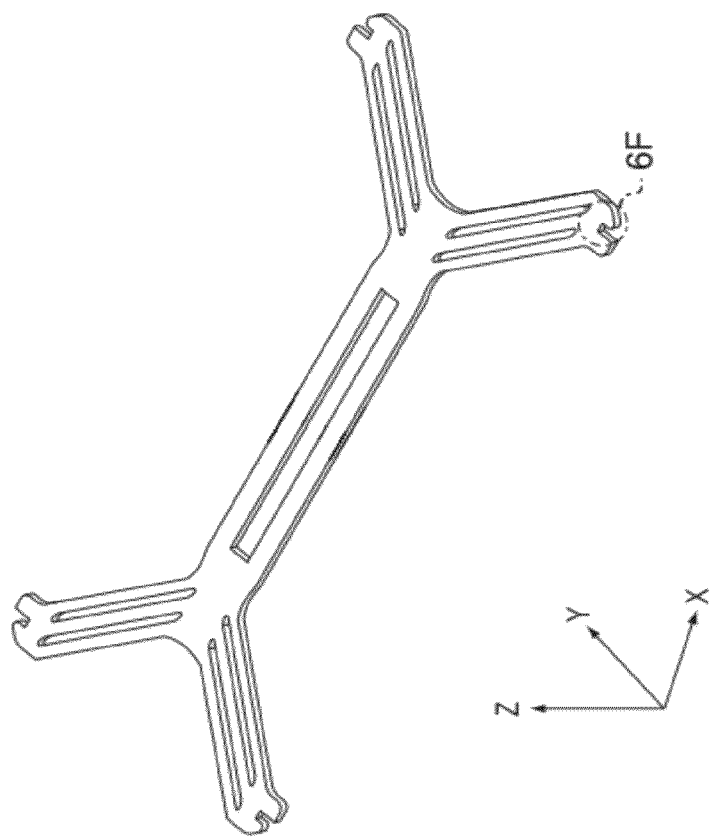

Suitable prototype parts may also be made via two dimensional cutting of preformed laminates with appropriately oriented fibers. FIGS. 6A, 6B, 6C and 6D illustrate the orientation of fibers in different laminate layers in a compression unit, with the fibers in the respective layers oriented at angles of 0°, 45°, 90° and 135°, respectively, from the longitudinal axis of that compression unit. FIG. 6E shows a compression unit, and FIG. 6F shows a detailed view of a notch in that compression unit. As shown in FIG. 6F, different layers of the laminate have fibers oriented at angles of 0°, 45°, 90° 135°, 135°, 90°, 45° and 0° from the longitudinal axis of that compression unit. The symmetry of this arrangement contributes to stability during processing and under load.

Figure 7A:
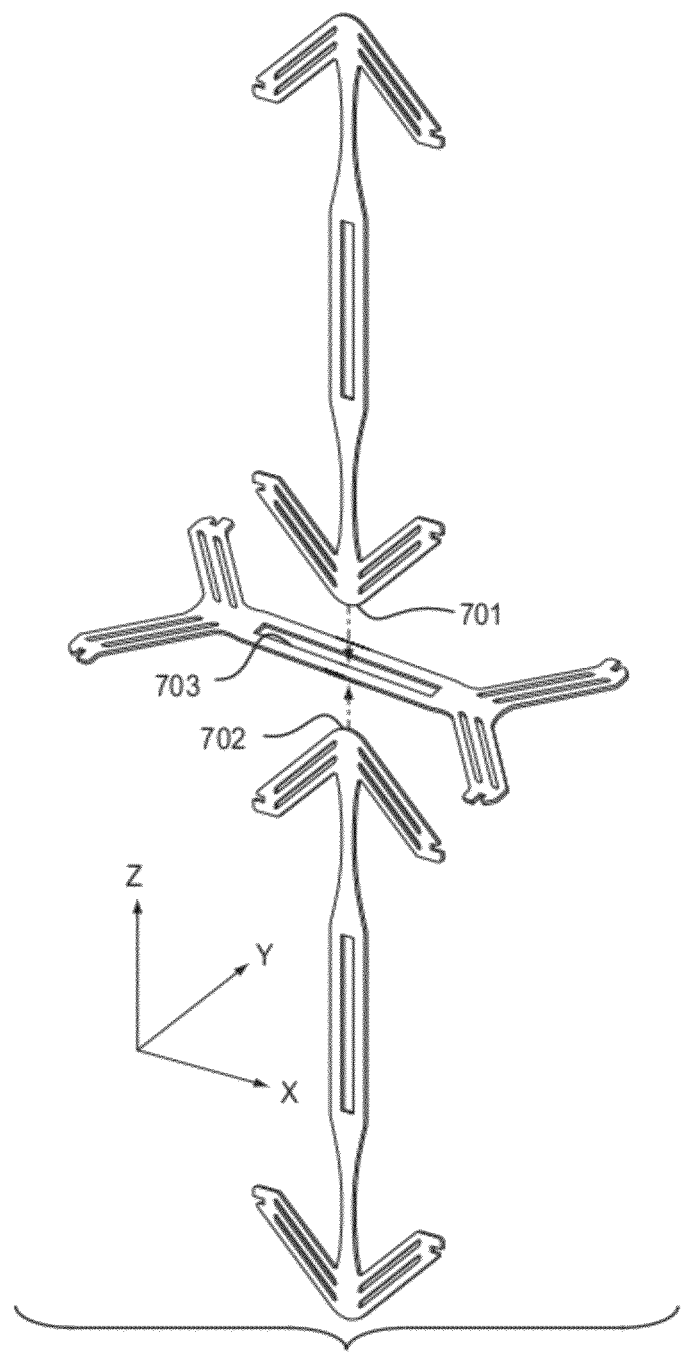
FIG. 7A shows two tension units, before their ends (one longitudinal end of each unit) are snapped together through a keyhole of a third compression unit, to elastically connect the three units.
Figure 7B:
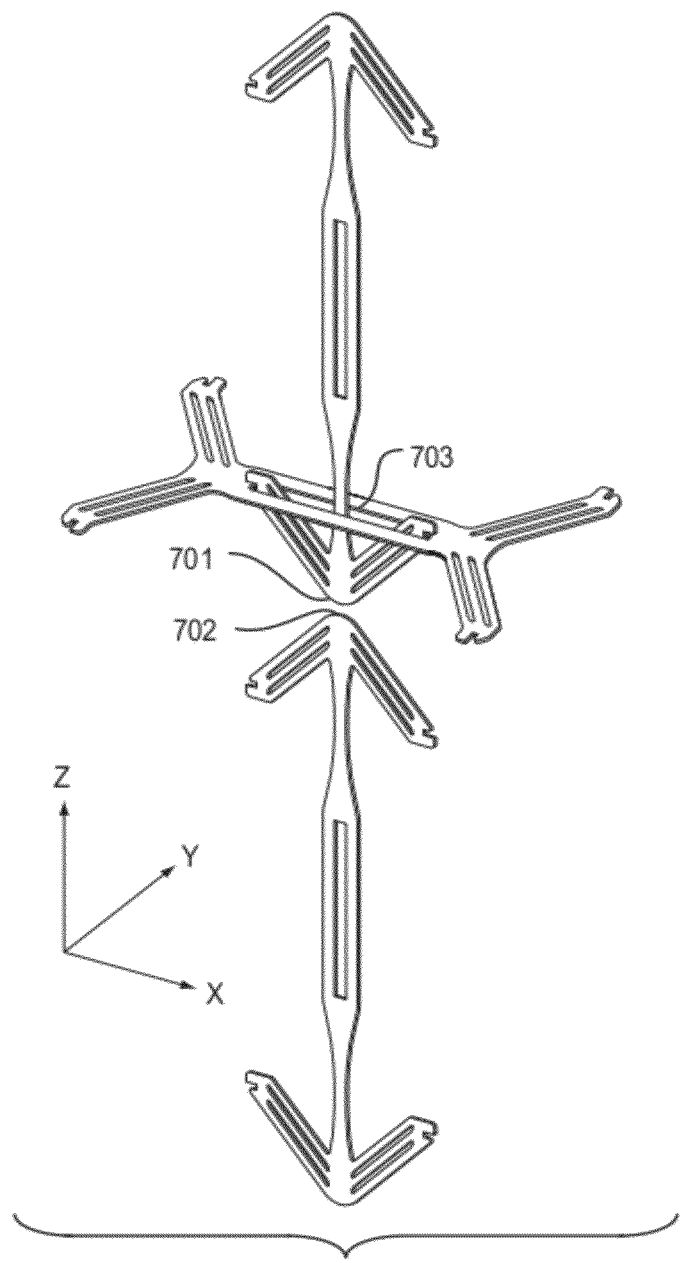
FIG. 7B shows these two tension units, as their ends are being snapped together through that keyhole.
Figure 7C:
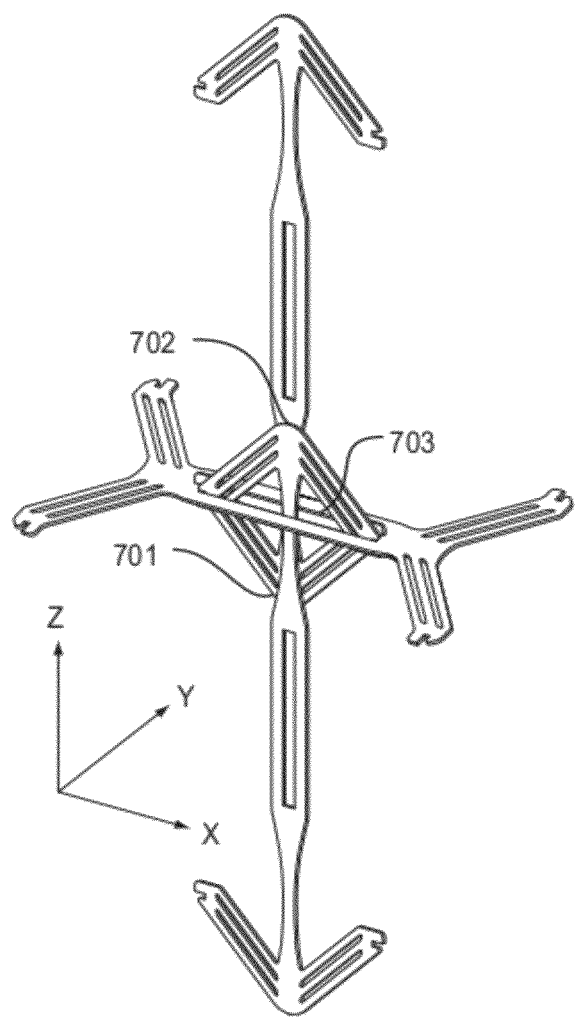
FIG. 7C shows these two tension units, after their ends have been snapped together through that keyhole.

FIGS. 7A, 7B and 7C show three units being connected together, by inserting tip 701 of a first unit and tip 702 of a second unit into keyhole 703 of a third unit. FIG. 7A shows the configuration before the tips are inserted into the keyhole, FIG. 7B shows the configuration after tip 701 of the first unit has been inserted, and FIG. 7C shows the configuration after the two tips have been inserted into the keyhole.

Figure 8A:
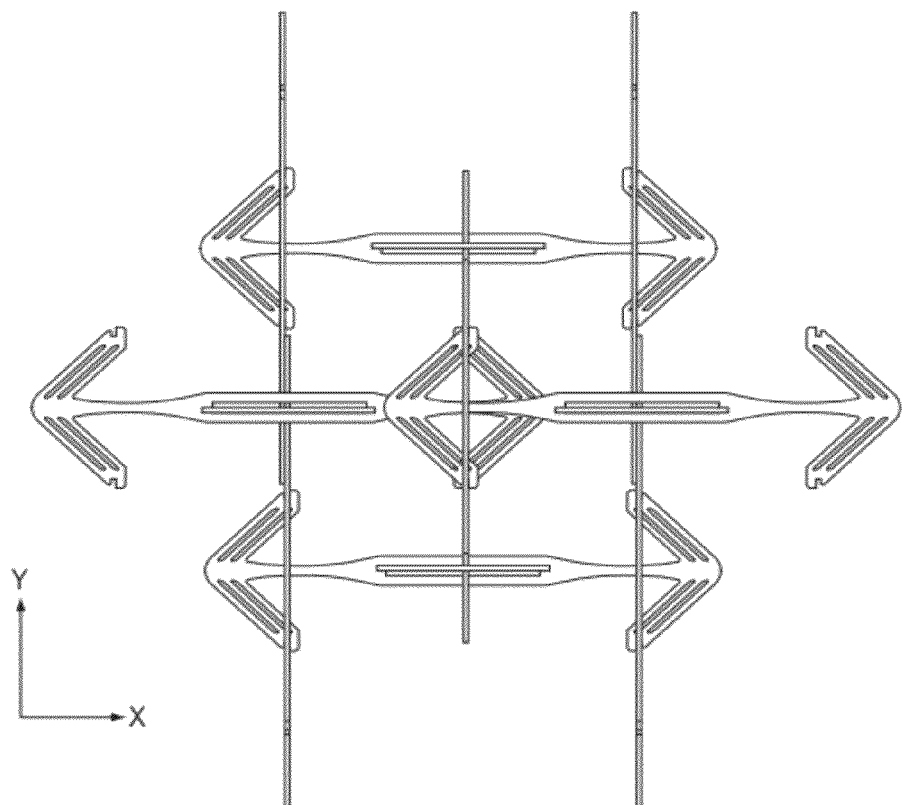
FIGS. 8A, 8C and 8D show different normal views.
Figure 8B:
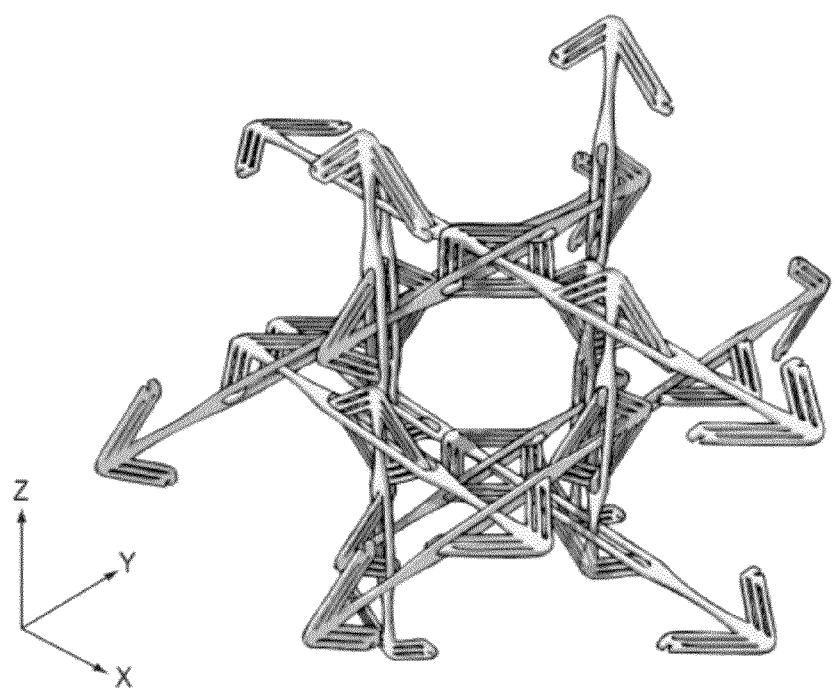
FIG. 8B shows a perspective view, of a sparse structure that comprises tension elements.
Figure 8C:
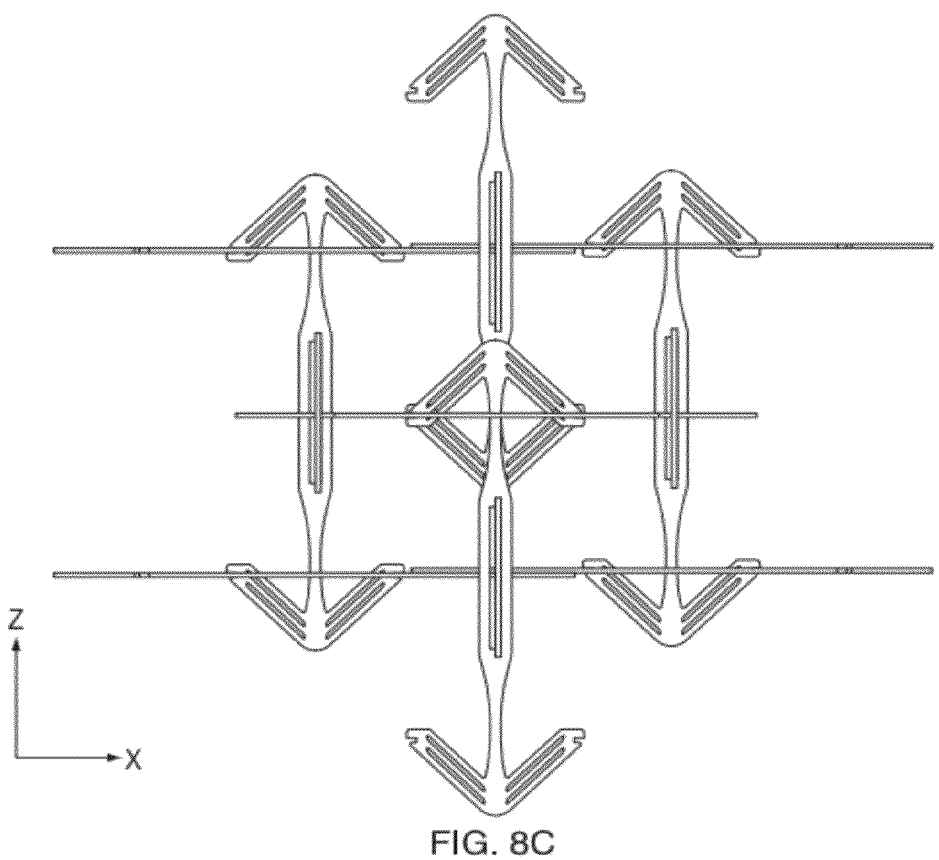
Figure 8D:
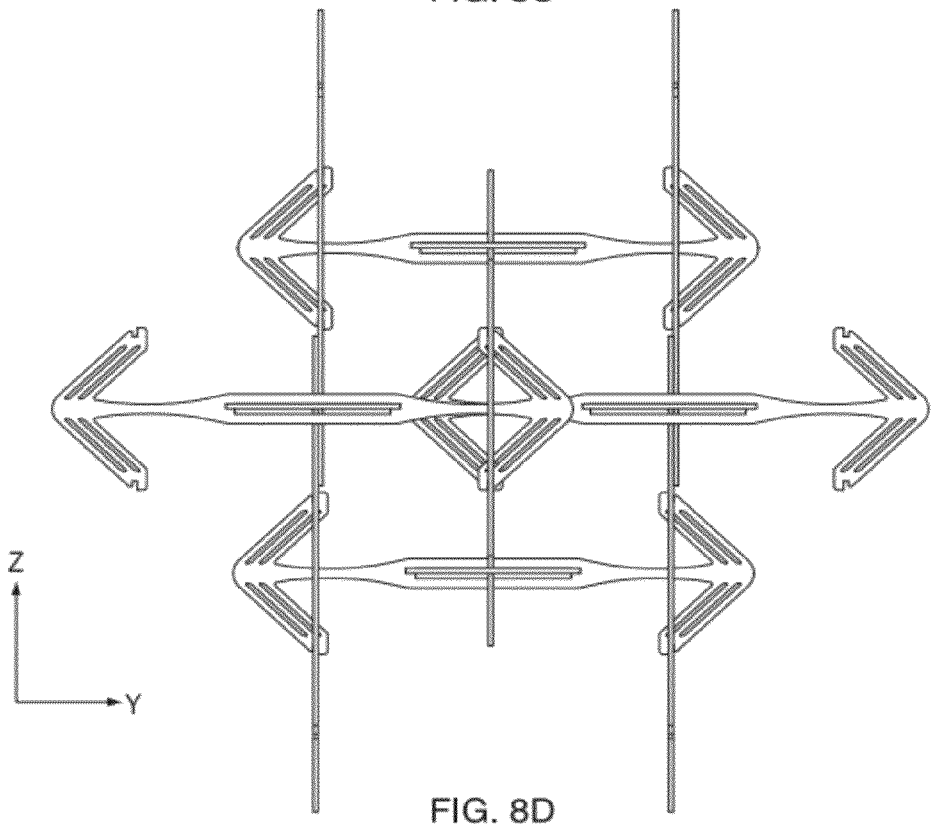

FIGS. 8A, 8C and 8D show different normal views, and FIG. 8B shows a perspective view, of a sparse structure that comprises tension elements.

Figure 8E:
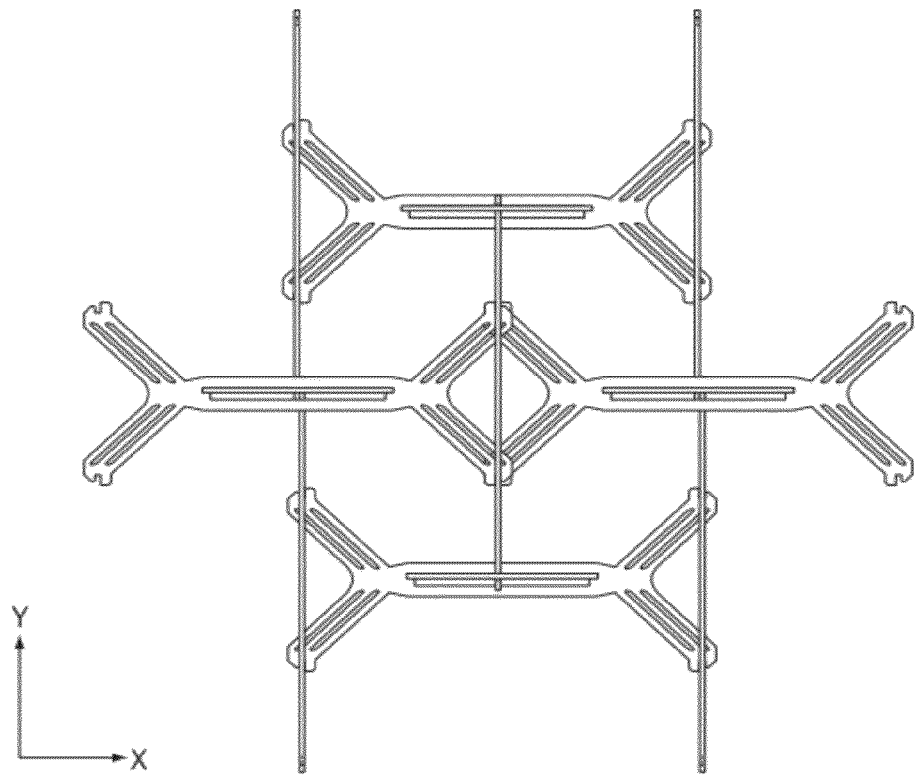
FIGS. 8E, 8G and 8H show different normal views.
Figure 8F:
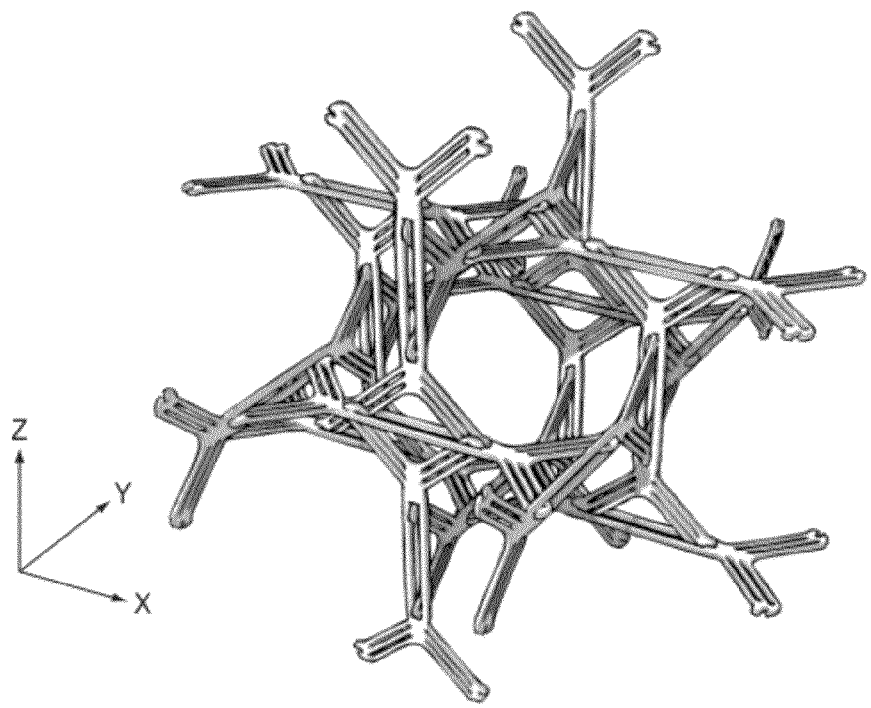
FIG. 8F shows a perspective view, of a sparse structure that comprises compression elements.
Figure 8G:
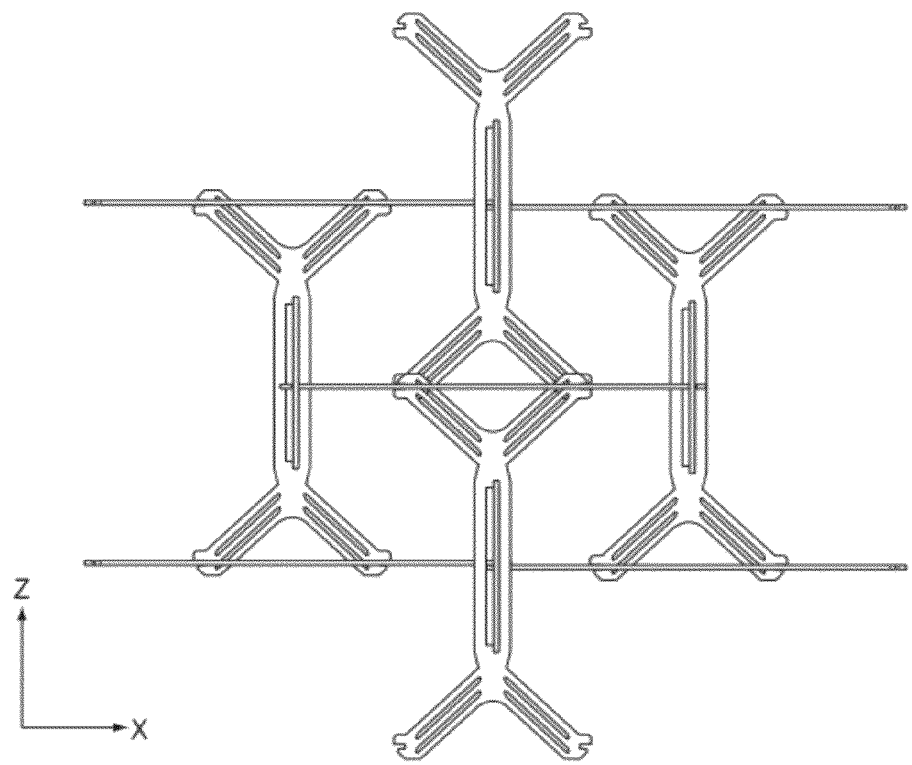
Figure 8H:
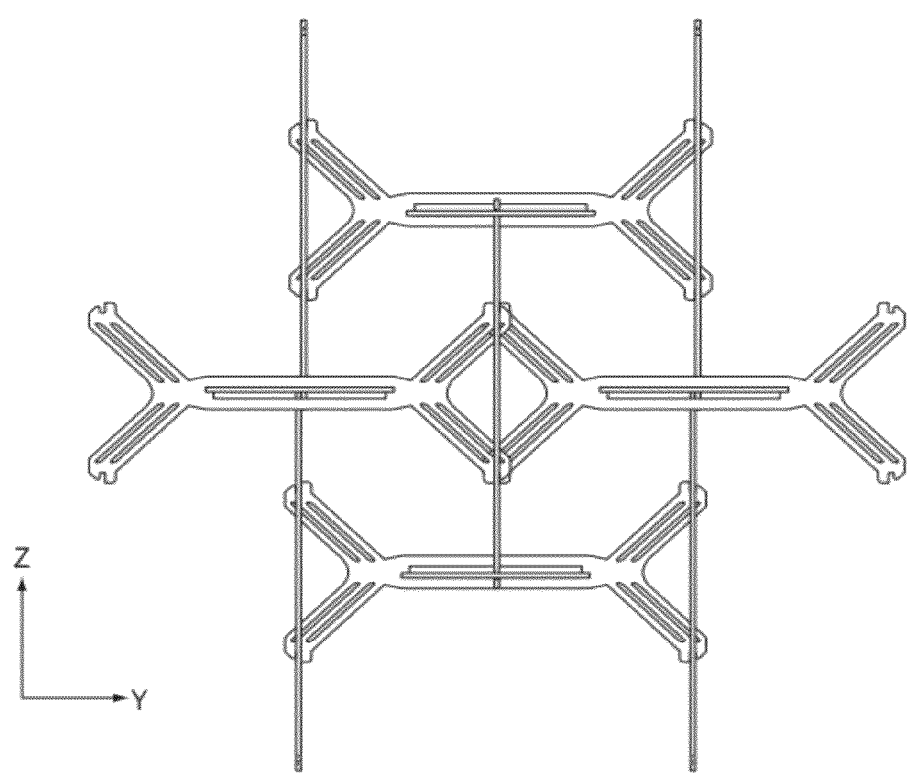

FIGS. 8E, 8G and 8H show different normal views, and FIG. 8F shows a perspective view, of a sparse structure that comprises compression elements.

Figure 9A:
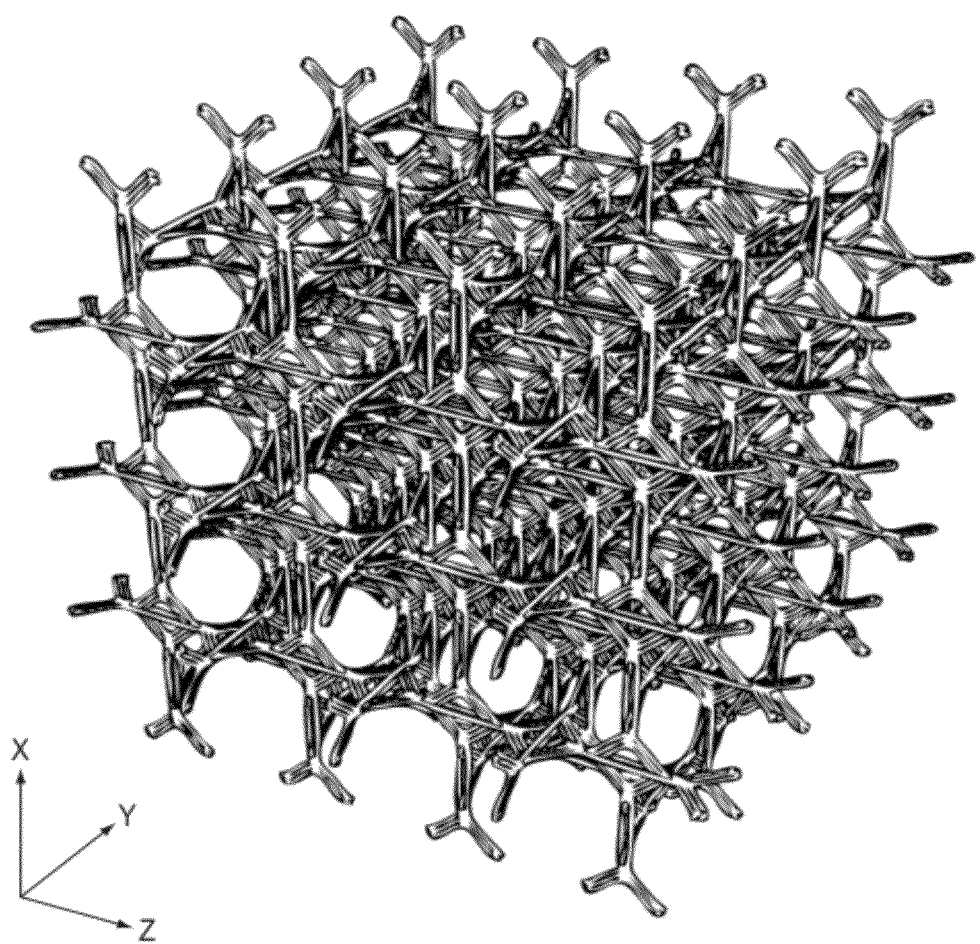
FIGS. 9A, 9B and 9C show different perspective views of a sparse structure that comprises compression elements.
Figure 9B:
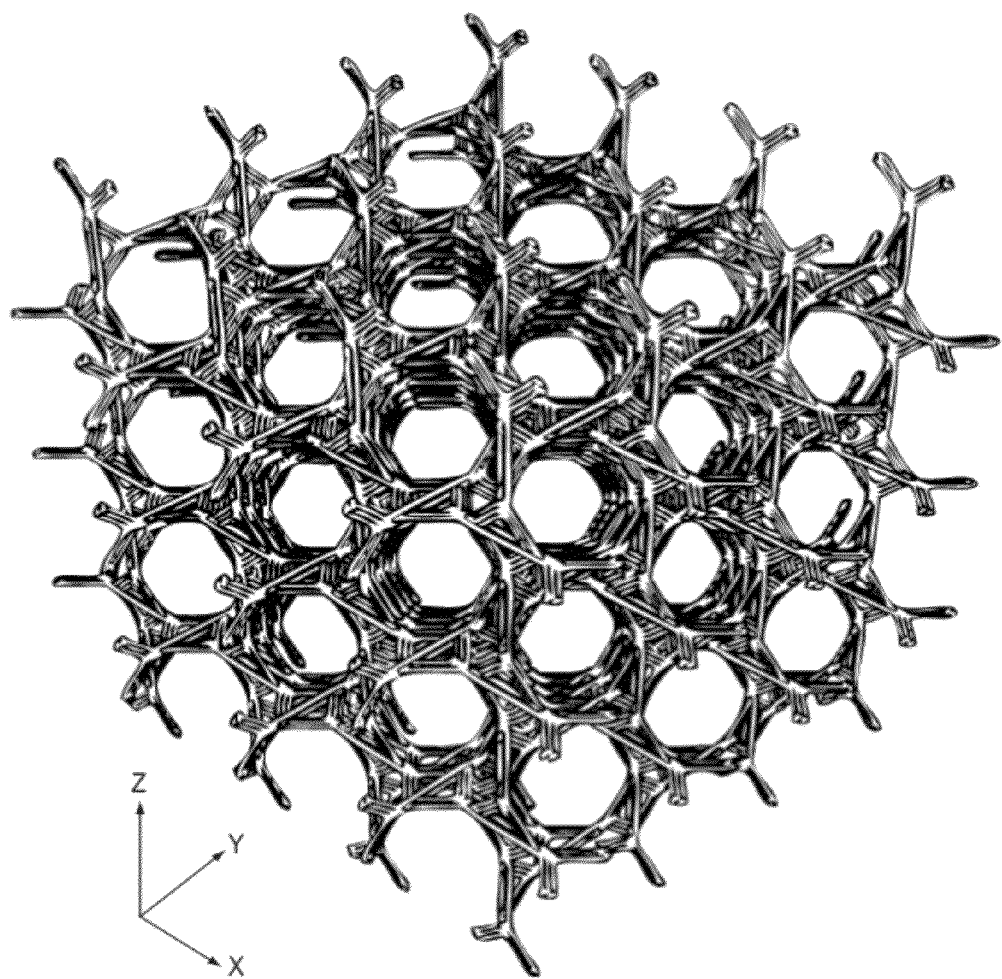
Figure 9C:
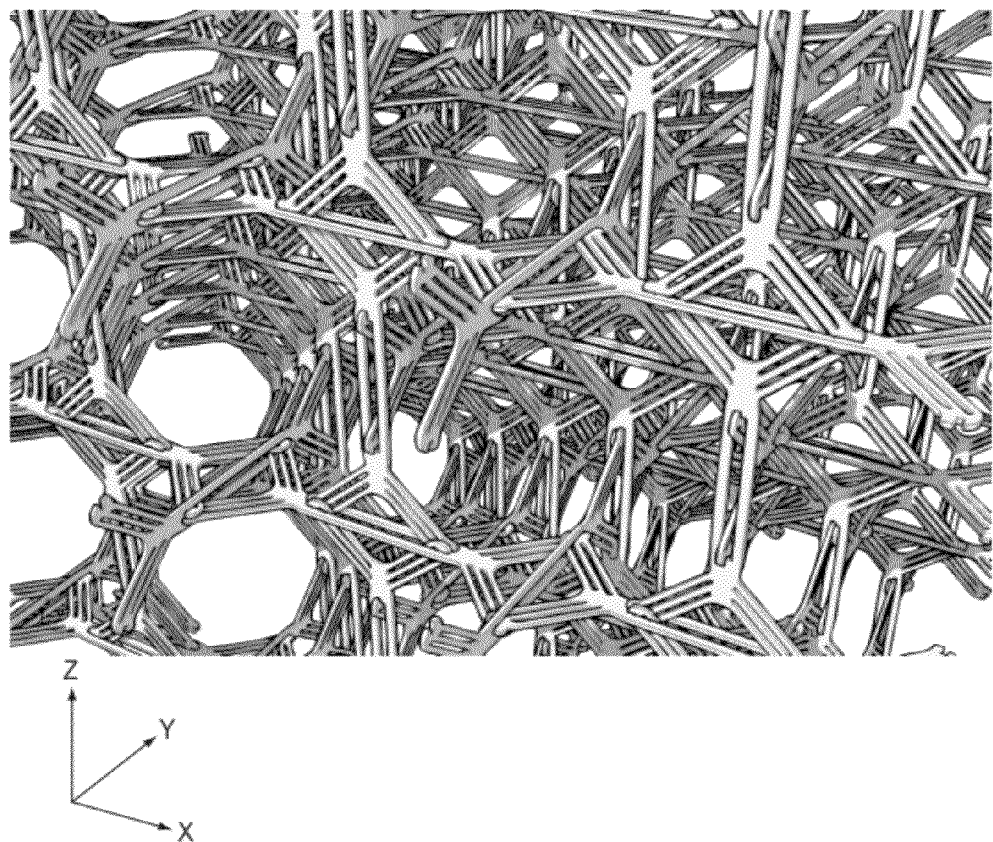

FIGS. 9A to 9C show a Snap Fit Digital Composite Volume with the parts described previously, incorporating flexural locking mechanisms, and programmability of the tensile and compressive strength of specific regions of a digital composite structure, through the placement of purpose-designed parts that compose the structure. Through the placement of these tension units and compression units, the material can be tuned to be stiff for particular geometric loading conditions and highly elastic in others. Specifically, FIGS. 9A, 9B and 9C show different perspective views of a sparse structure that comprises compression elements.

Through mechanical property programming, as described above, the bulk properties of the Digital Composite material can progress from primarily compressive strength through tensegrity-like properties to primarily tensile strength. As such, related attributes, such as poisson ratio, can be programmed as well.

The topology of a Digital Composite Volume may be any volume filling meshing, with arbitrary node connectivity, as necessary to achieve desired range of configurations.

Example 2

Digital Composite Surface

In another exemplary embodiment, called the Digital Composite Surface, a continuous structure of discrete units forms the structure, as a space filling surface system of three-connected nodes (with locking mechanisms that are similar to those in the Digital Composite Volume examples). The units may be used to form an arbitrarily large sheet of material, with arbitrary topology.

Smooth surface topologies can be achieved due to the elasticity of the parts. This allows the device to form non Euclidean, non-developable surface forms, such as spherical or hyperbolic shells with programmable porosity (as well as continuous assemblages of geodesic and hyperbolic regions).

Figure 10A:
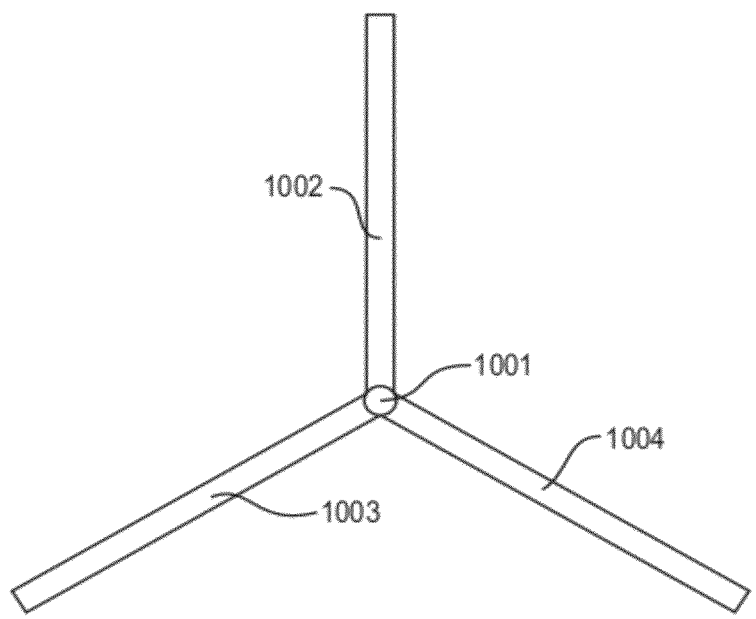
FIG. 10A shows a substructure comprising a node and three units of equal length that are connected to that node.

FIG. 10A shows elements that can be for an assembly system that generally employs only two types of primitives. In the example shown in FIG. 10A, there are two main types of primitives in the system. The first is a node (e.g., 1001), and the second is a connector (e.g. 1002, 1003, 1004). In the example shown in FIG. 10A, all nodes connect exactly three connectors, and all connectors are of the same length.

Figure 10B:
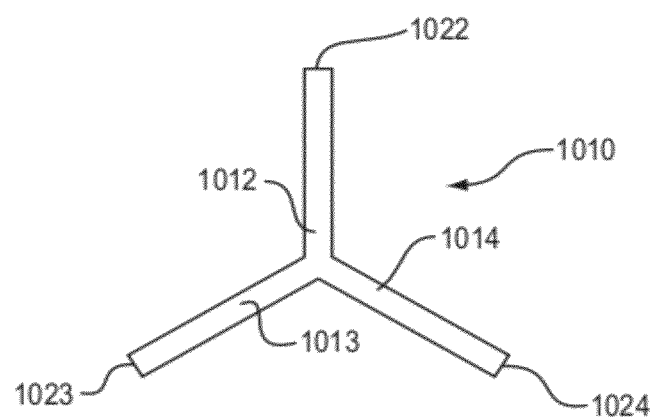
FIG. 10B show an example of a type of unit that can be used for assembly that generally requires only one type of primitive.

FIG. 10B show an example of a type of unit 1010 that can be used for an assembly system that generally employs only one type of primitive. In FIG. 10B, there is no need for a separate node to join connectors. Instead, each arm 1012, 1013 and 1013 of the unit 1010 is half of a connector, and the tips 1022, 1023 and 1024 of the respective arms can each connect to up to three other units.

FIG. 10C shows a different example of a unit 1030 that can be used for an assembly system that generally employs only one type of primitive. Again, there is no need for a separate node to join connectors. Instead, there are three arms 1032, 1033, 1034. The tip 1042 of arm 1032 is adapted to connect to two other arms (of two different units, respectively).

The primitives shown in FIG. 10A, 10B or 10C, respectively, may be employed to create arbitrary shapes, surfaces and volumes.

FIGS. 10A, 10B and 10C are each normal (or top) views. In FIG. 10A, the connectors attached to a three-connected node may either: (a) all be located in the same plane, or (b) not be located in a single plane. Likewise, in each primitive shown in FIGS. 10B and 10C, the arms may either: (a) all be located in the same plane, or (b) not be located in a single plane.

FIG. 10D shows a node connected to three curved arms.

FIG. 10E shows a sparse structure, in which each node is connected to three arms. Each arm is also connected to another node. Thus, each node is connected to three other nodes.

The conformation of the Digital Composite Surface is achieved through local connectivity of the individual units. Units in the Digital Composite Surface are connected to as many other units as are defined in the surface topology—three, in the example shown in FIG. 10A.

The topology of a Digital Composite Surface may be any surface meshing, with arbitrary node connectivity, as necessary to achieve desired range of configurations.

For complex shapes, this provides a potential "tool-less" assembly process, where the geometry of the parts being assembled provides the dimensional constraints required to precisely achieve complex forms. This does not rely on each part being very precise, but instead relies on specific knowledge of the nature of the errors that do occur. For instance, a system whose assembly over-constrains elastic components can provide positioning with much higher precision than that which is contained within the shape of any single component.

The decomposition of any surface as an assemblage of planes, geodesic, and hyperbolic surfaces that can be approximated by this system may be automated, based on the curvature map of the form, and the known flexibility of the material used for the components.

The two types of components in FIG. 10A—stick and nodes—may be cut with a two-dimensional CNC cutting system. The system is sufficiently constrained such that the material solves for the final shape, which is true to the generative form without the need for any of the conventional form-work used to manufacture these types of shapes.

Figure 11A:
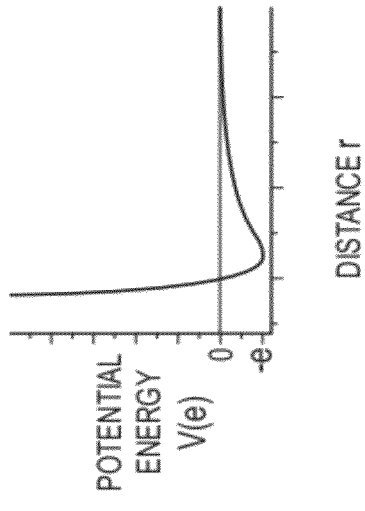
FIGS. 11A, 11B and 11C are interaction potential diagrams for (a) interaction between two neutral atoms or molecules, according to the Lennard-Jones model, (b) interaction between digital units with orthogonally pinned connections, and (c) interaction between digital units with pre-loaded snap-fit connections, respectively.
Figure 11B:
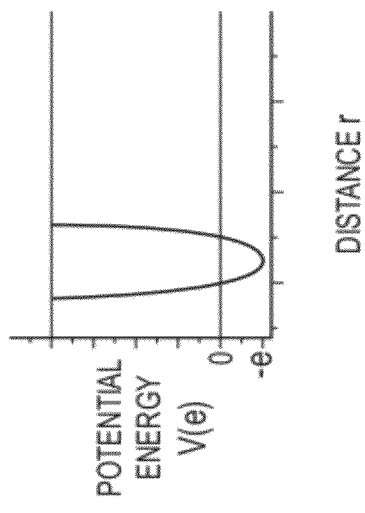
Figure 11C:
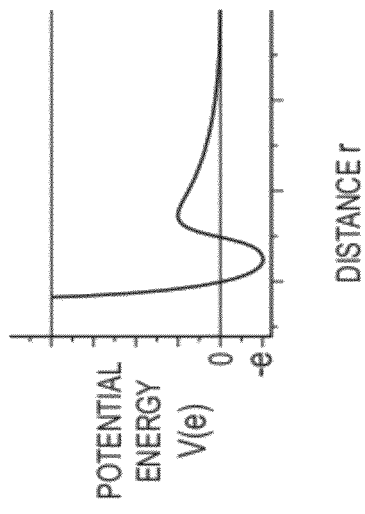
Figure 12A:
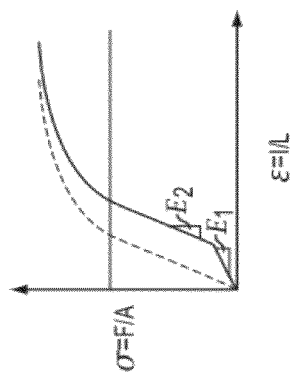
FIGS. 12A, 12B, 12C and 12D illustrate tunable multiphase elasticity. Specifically, these Figures are stress-strain diagrams of bulk material in different scenarios.
Figure 12B:
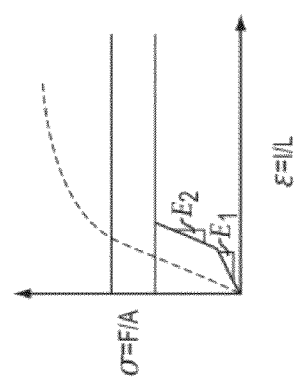
Figure 12C:
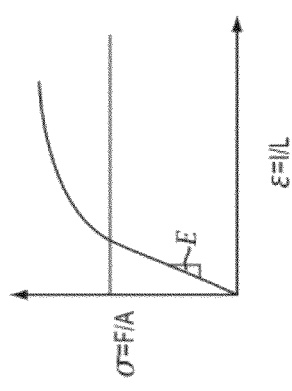

FIGS. 11A, 11B, 11C are graphs of interaction potentials, and FIGS. 12A, 12B and 12C are graphs of stress-strain curves. Each is discussed in more detail below.

Example 3

Pinned Digital Composite Volume

In an exemplary embodiment, called the Pinned Digital Composite Volume, a continuous structure of discrete units fills a volume, whereby units are distributed across a three dimensional lattice.

This design comprises two types of elements—a crossbar (also called a "pinned unit") and a compression clip. FIGS. 16A, 16B, 16C and 16D show that, when assembled, ends of four crossbar 1601, 1602, 1603 and 1604 meet at a central location and orthogonal to a fifth crossbar 1605, where they are secured with a clip (1606) that is inserted orthogonally to the five crossbars. The resulting structure can be seen as vertex connected regular octahedrons or square-face connected cuboctahedrons.

Figure 13A:
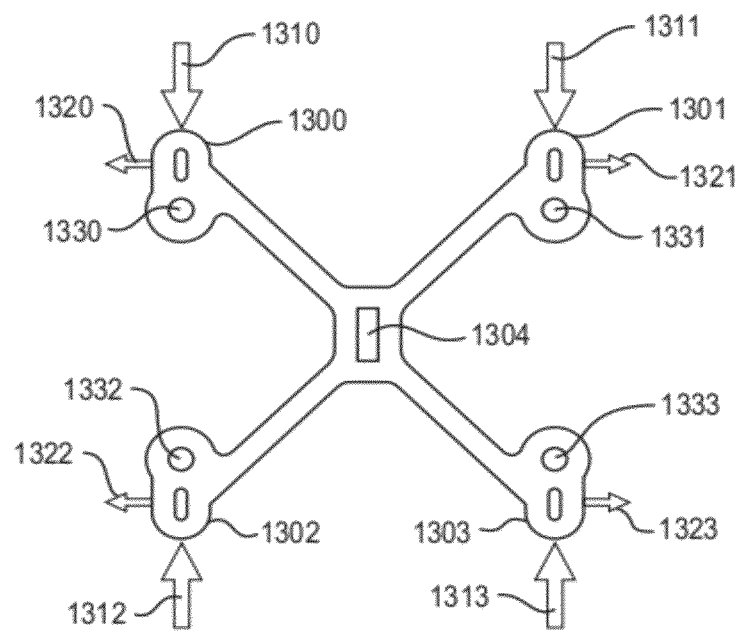
FIGS. 13A and 13B shows units under compressive load and tension load, respectively. Units of the type shown in FIGS. 13A and 13B are sometimes referred to herein as "pinned units" or "crossbars".
Figure 13B:
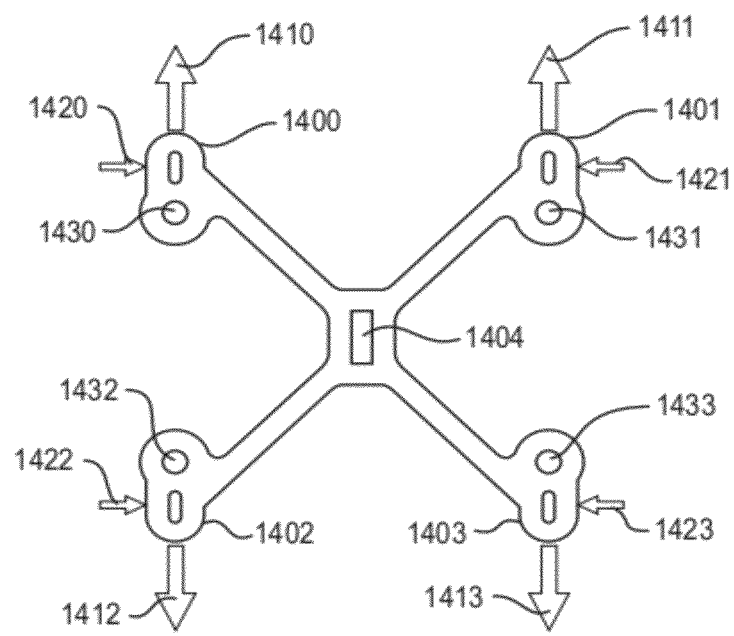

FIGS. 13A and 13B shows a design for a crossbar that can be used to assemble a tuned Pinned Digital Composite Volume. The crossbar comprises a carbon fiber epoxy composite part with a pinned locking mechanism (e.g., clip 1606 in FIGS. 16B, 16D and 16E). To add a new crossbar to a structure, first remove any pins that are located at connections where the new part is being added (and remove edge placeholders if used), then insert the new crossbar, and replace the pins.

Each of the crossbars (e.g. 1601, 1602, 1603, 1604, 1605) are identical and include pinned locking mechanisms and load transfer mechanisms, both of which are described in further detail, below.

As shown in FIG. 13, the pinned locking mechanisms comprise slotted tabs (1300, 1301, 1302, 1303, 1400, 1401, 1402, 1403) that fit into larger slots (e.g., 1304, 1404) on adjacent parts. These tabs can include flexural snap fit tabs, but the primary fastening mechanism in the example shown is the pin (1606). Handles (1330, 1331, 1332, 1333, 1430, 1431, 1432, 1433) facilitate automated assembly. These handles remain out of the way of the connection, and can be easily grasped by a machine. Each central keyhole (1304, 1404) allows four orthogonal units (two from either direction) to be simultaneously locked in. The regularity of the spatial arrangement of these four parallel tabs in the central keyhole (as shown in FIGS. 17A, 17B, 17C and 17D) affects connection derived elastic properties, depending on the aspect ratio of the parts (thickness to strut length). The simplest solution is to use consistent and equalized placement of tabs according to global orientation.

In a Pinned Digital Composite Volume, axial tensile or compressive loads on crossbars can be transferred to orthogonal neighboring crossbars.

The load transfer mechanisms may utilize the ideal angle of the struts in the crossbar. Loading is shown by the arrows marked 1310, 1311, 1312, 1313 in FIG. 13A and the arrows marked 1410, 1411, 1412, 1413 in FIG. 13B. Reaction deflection is shown by the arrows marked 1320, 1321, 1322, 1323 in FIG. 13A and the arrows marked 1420, 1421, 1422, 1423 in FIG. 13B. The forces required to assemble these structures can be provided by an external device that places the pins; the forces required to disassemble these structures are either simply set by the yield capacity of the pins, or can be provided by an external device, such as a robotic digital assembler/disassembler. If connection based elastic properties are to be minimized in this design, then the crossbar struts may be made very slender relative to the connection details, in order to provide relatively large surface areas for the connection mechanism.

Figure 14:
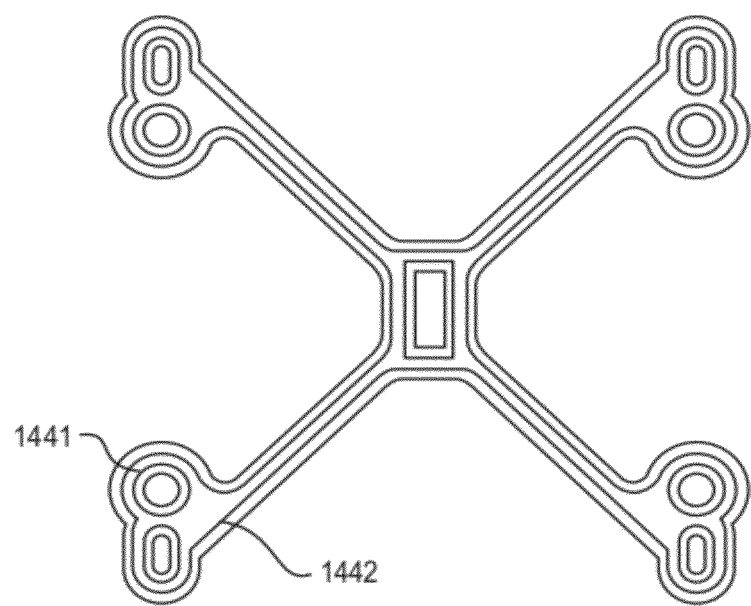
FIG. 14 shows fiber orientations in a pinned unit.
Figure 15A:
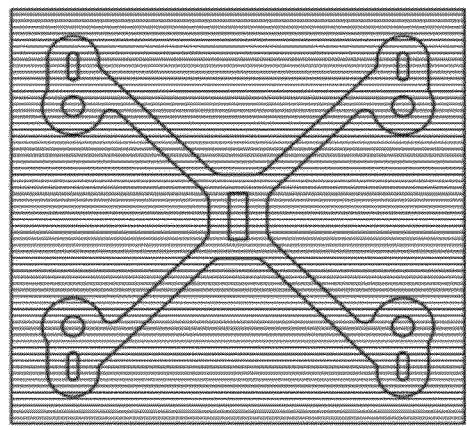
FIG. 15 shows fiber orientations in different layers of a laminate pinned unit.
Figure 15B:
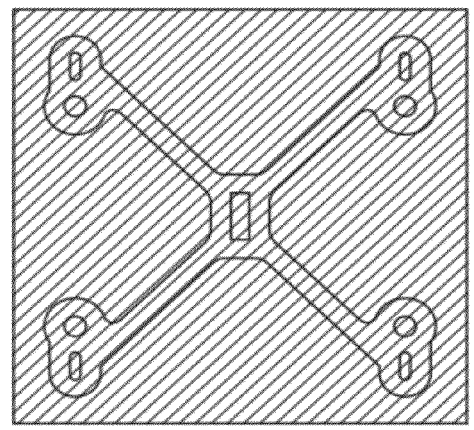
Figure 15C:
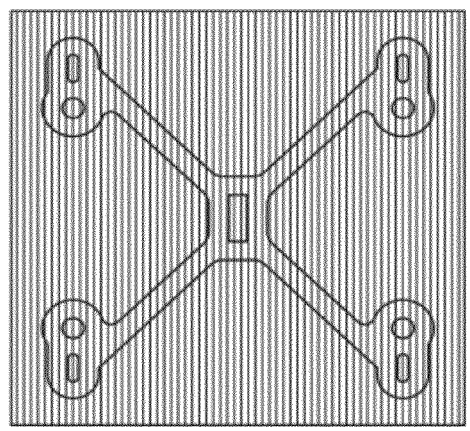
Figure 15D:
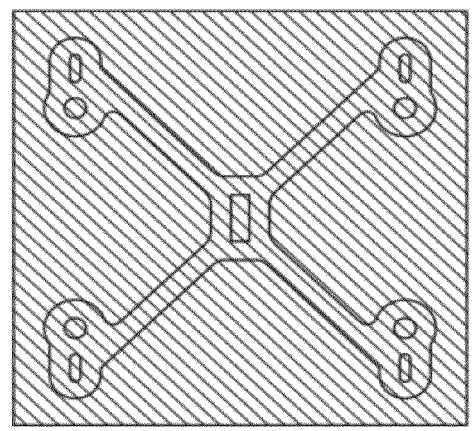

FIG. 14 is a diagram of an example of fiber continuity and orientation for these parts. Note the loop of some fibers around the slots feature (1441)), and the end-to-end continuity of other fibers (1442)) that extend across the struts and around the slots.

Production of the parts may be via conventional resin transfer molding or pultrusion and slicing (similar to FIG. 4). Given the fiber continuity and orientation shown in FIG. 14, the pultrusion process may be made simpler by producing interlocking strut pieces and slot/hole pieces (similar to FIG. 5) as separate pieces to be bonded together before slicing. Suitable prototype parts may also be made via two dimensional cutting of preformed laminates with appropriately oriented fibers. FIGS. 15A, 15B, 15C and 15D illustrate the orientation of fibers in different laminate layers for such a part, with the fibers in the respective layers oriented at angles of 0°, 45°, 90° and 135°, respectively, from a reference direction, organized with symmetry similar to the example given in FIG. 6 unless torque response to loading is desired.

Figure 16A:
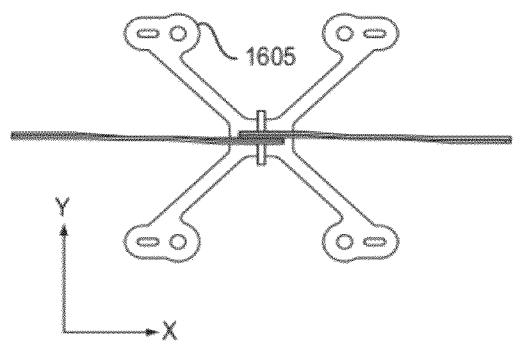
FIGS. 16A, 16C and 16D are normal views.
Figure 16B:
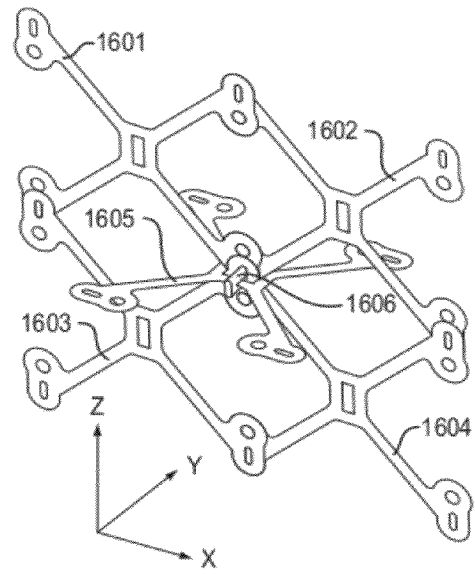
FIG. 16B is a perspective view, of pinned units after they have been pinned together by the clip shown in FIG 6E.
Figure 16C:
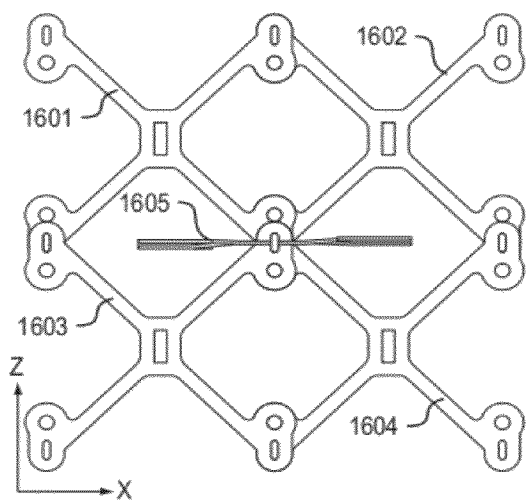
Figure 16E:
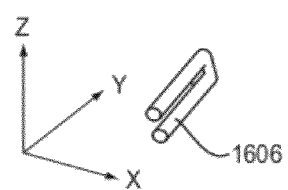
Figure 16D:
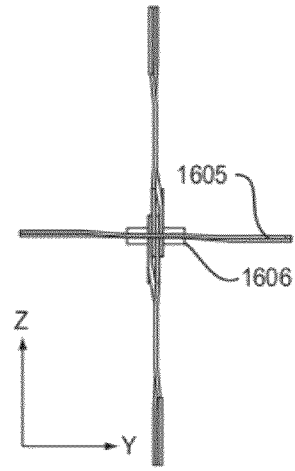

FIGS. 16A, 16C and 16D are normal views, and FIG. 16B is a perspective view, of crossbars after they have been pinned together by the clip shown in FIG 6E.

Figure 17A:
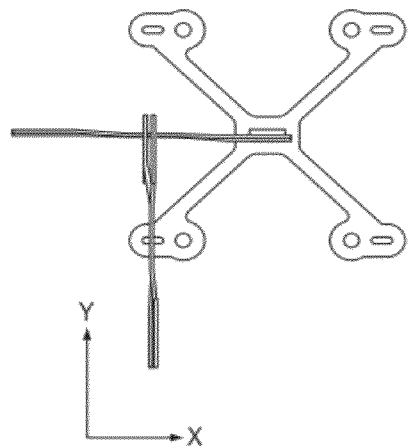
FIGS. 17A, 17C and 17D are normal views.
Figure 17B:
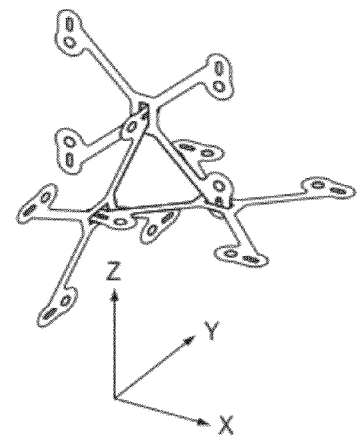
FIG. 17B is a perspective view, of pinned units after they have been assembled.
Figure 17C:
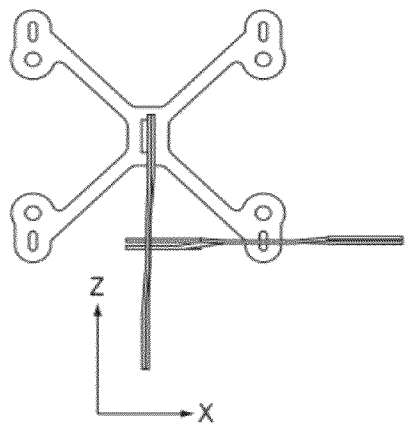
Figure 17D:
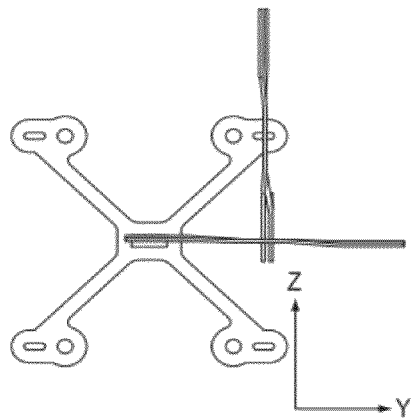

FIGS. 17A, 17C and 17D are normal views, and FIG. 17B is a perspective view, of crossbars after they have been assembled.

Figure 18A:
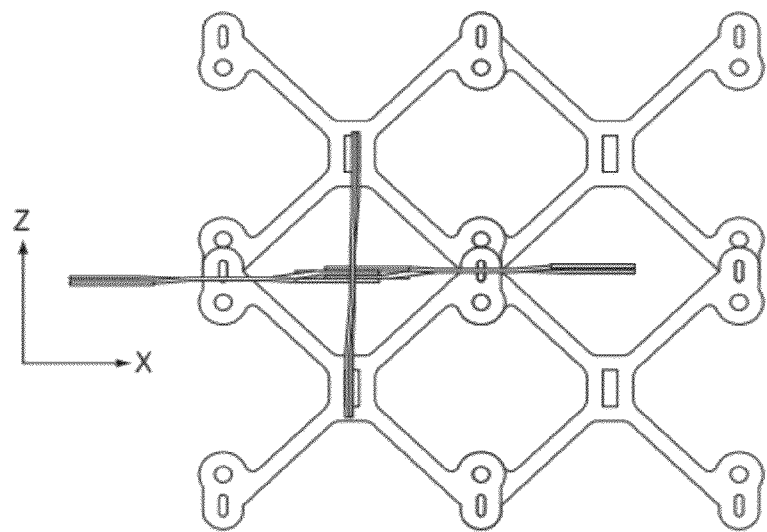
FIGS. 18A and 18B are normal views of pinned units after they have been assembled.
Figure 18B:
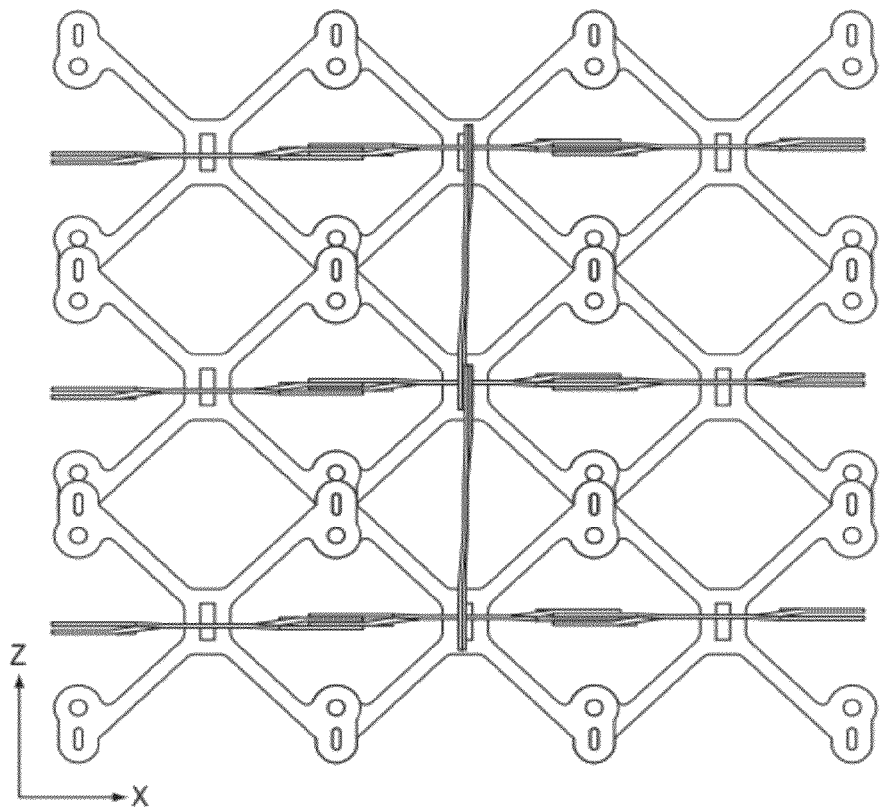

FIGS. 18A and 18B are normal views of crossbars after they have been assembled.

Figure 19A:
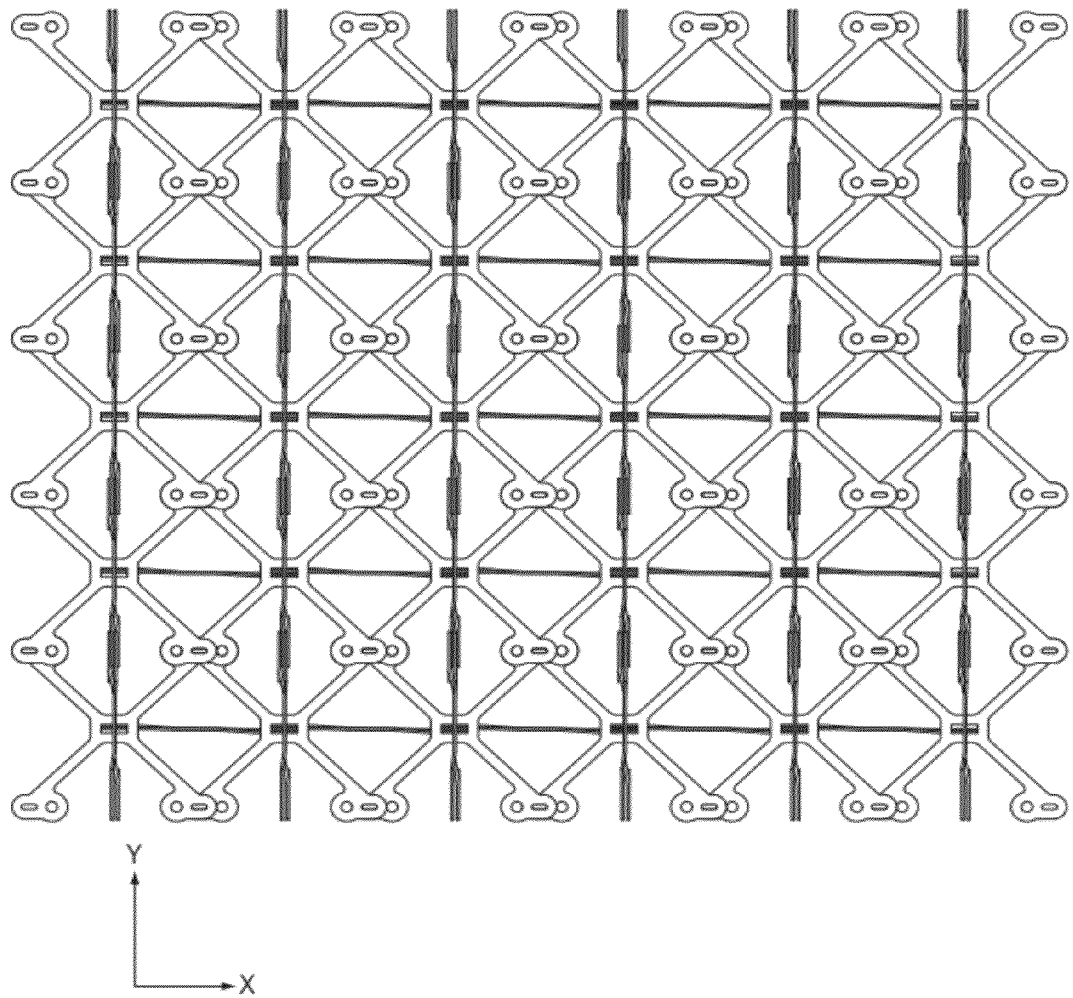
FIGS. 19A, 19B and 19C are normal views of pinned units after they have been assembled to form a volumetric structure.
Figure 19B:
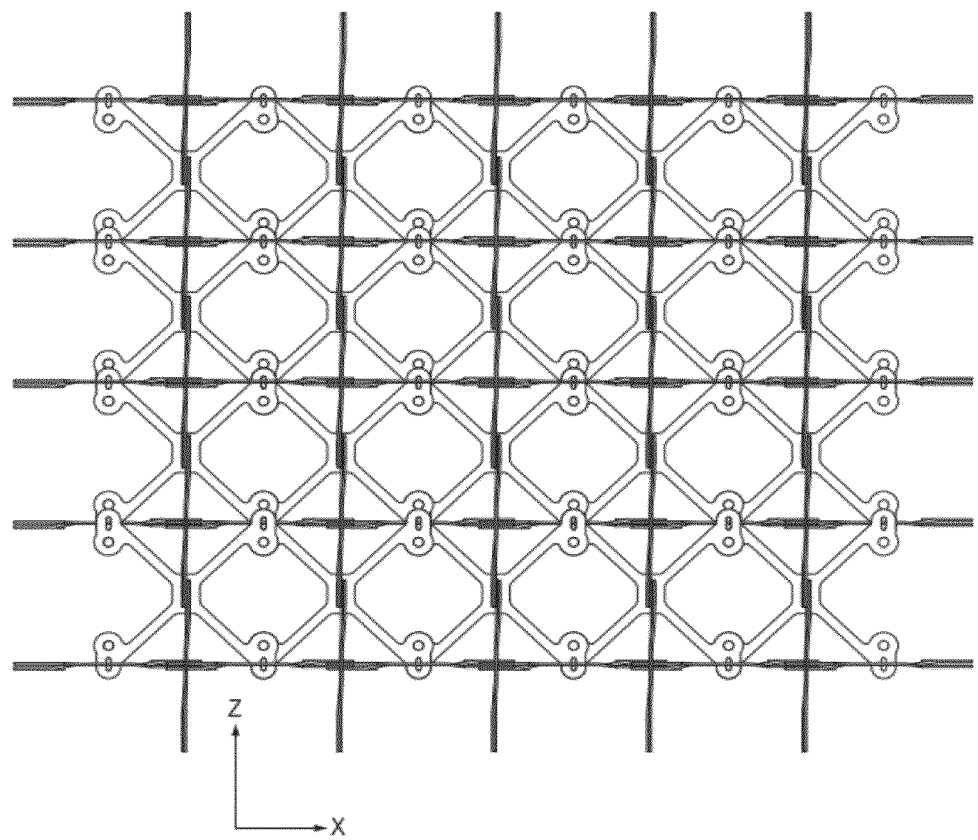
Figure 19C:
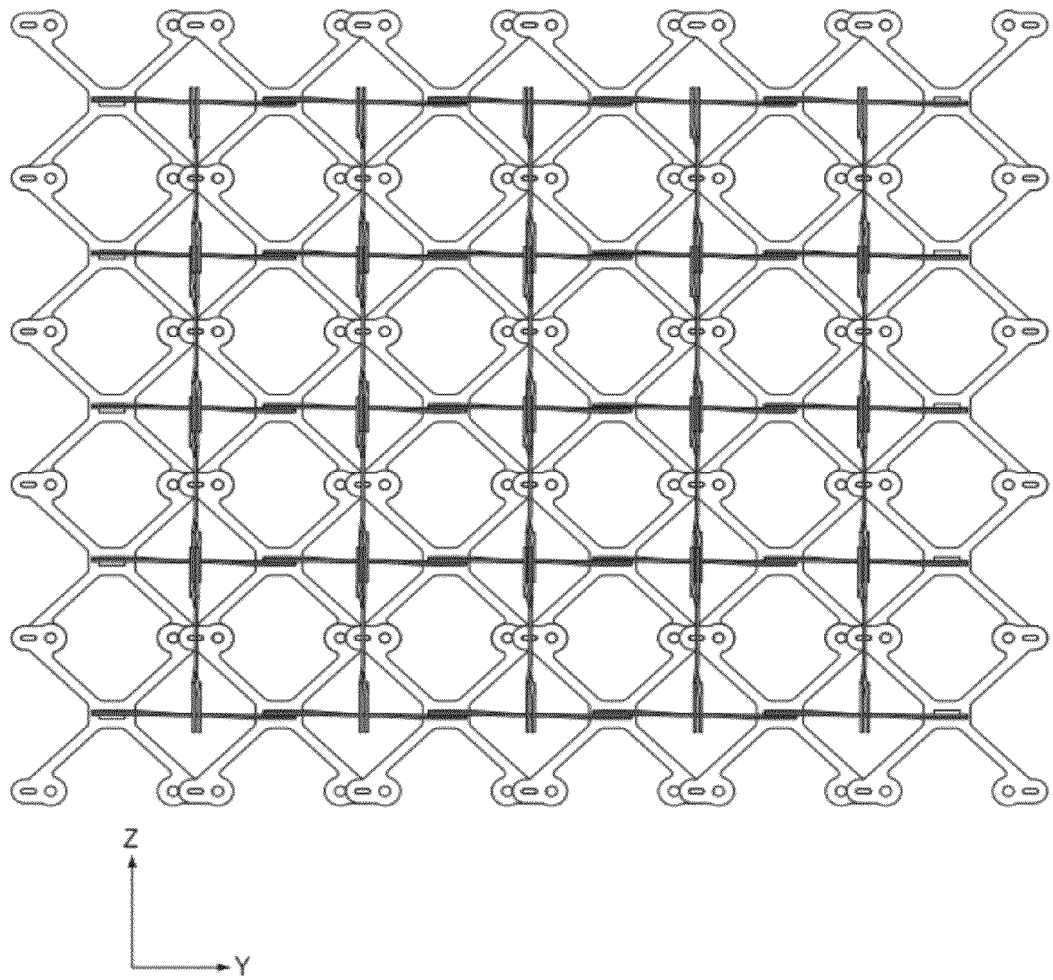
Figure 19D:
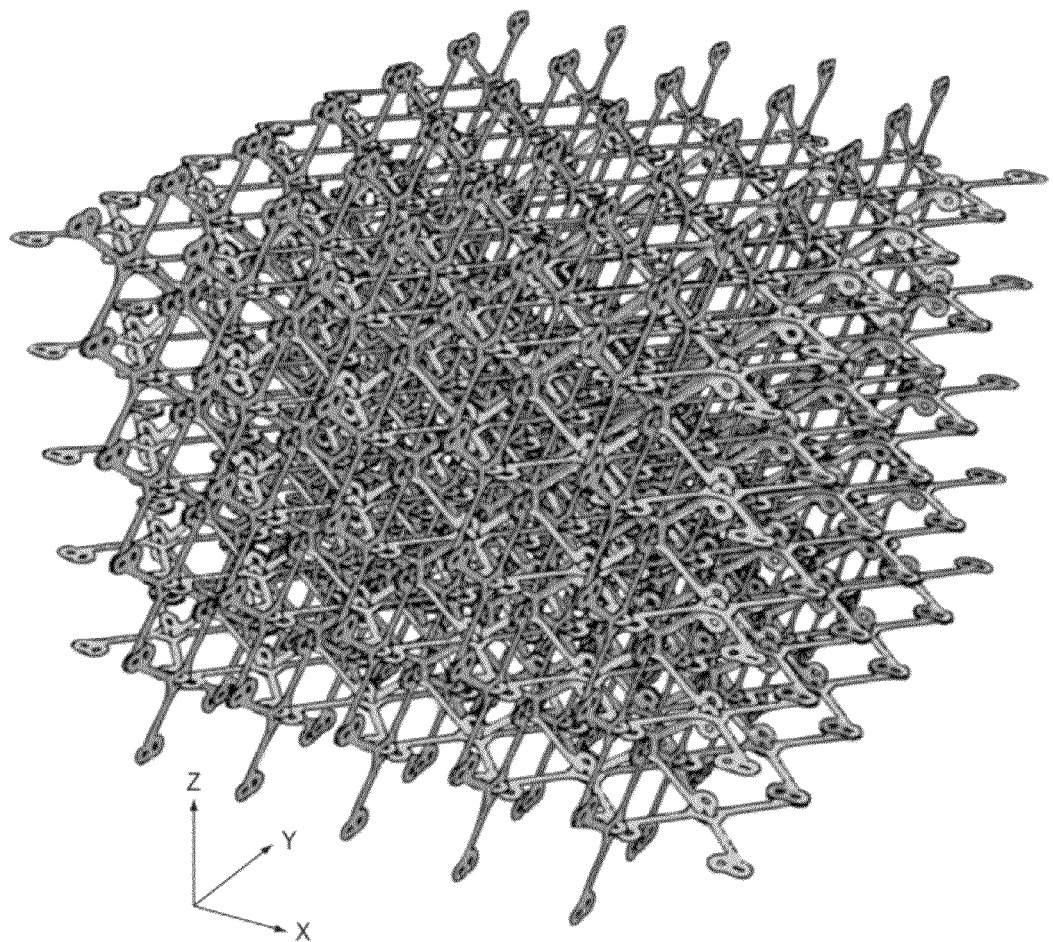
FIGS. 19D, 19E, 19F and 19G are perspective views of pinned units after they have been pinned together to form a volumetric structure.
Figure 19E:
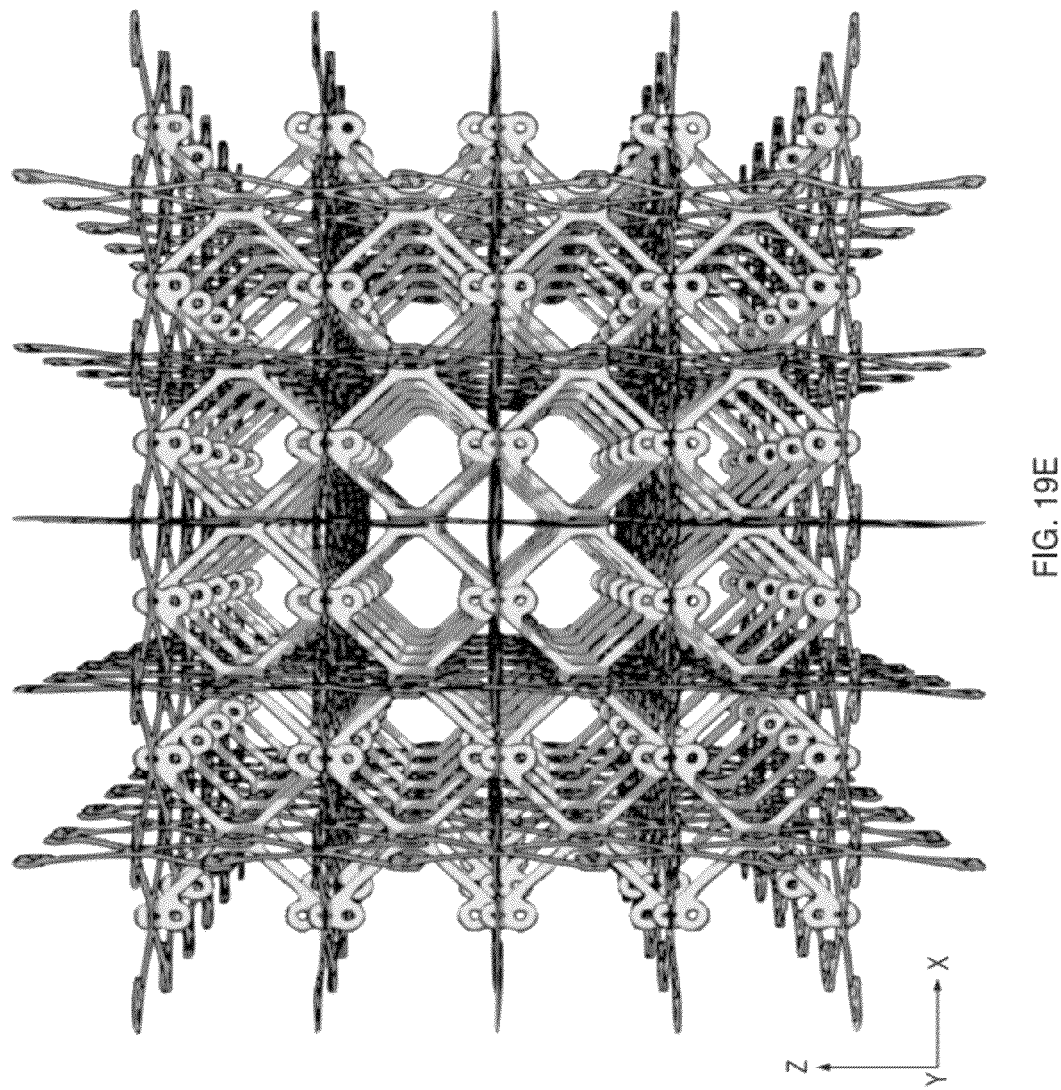
Figure 19F:
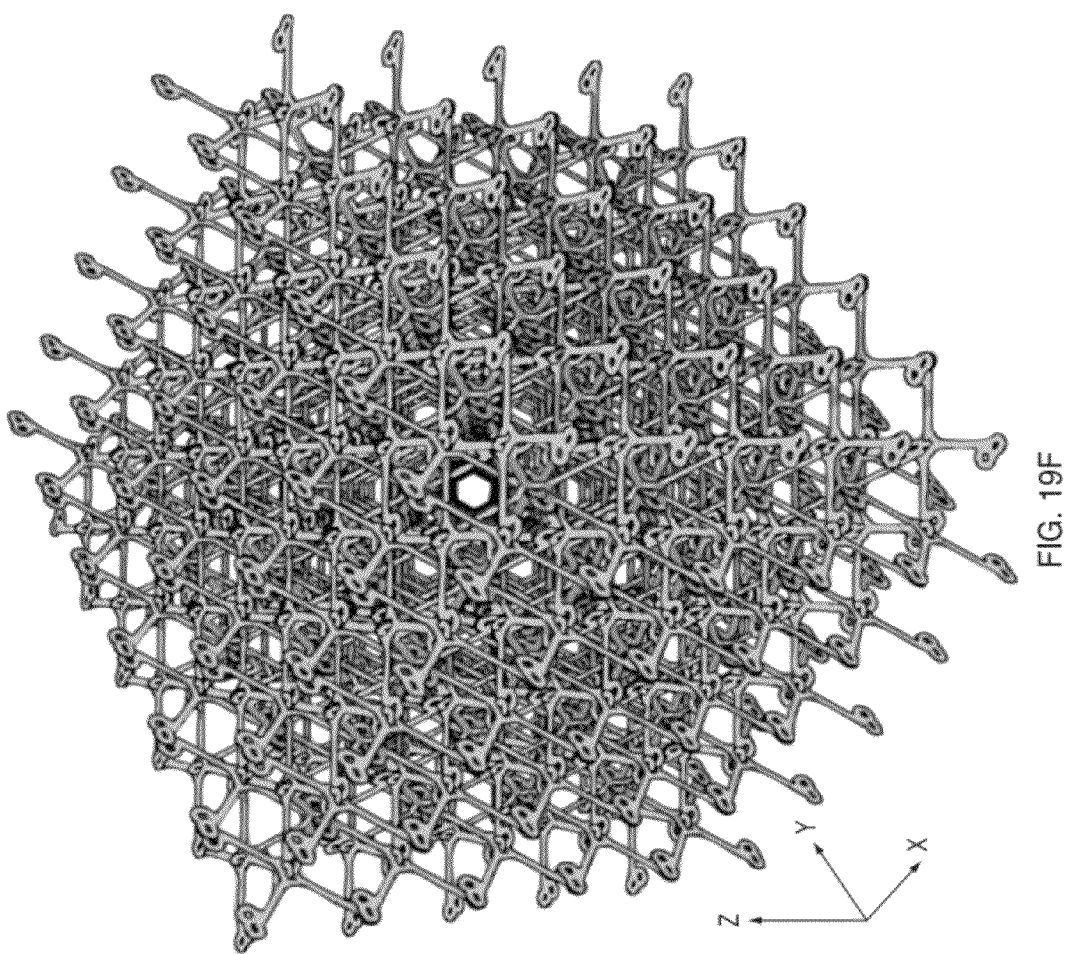
Figure 19G:
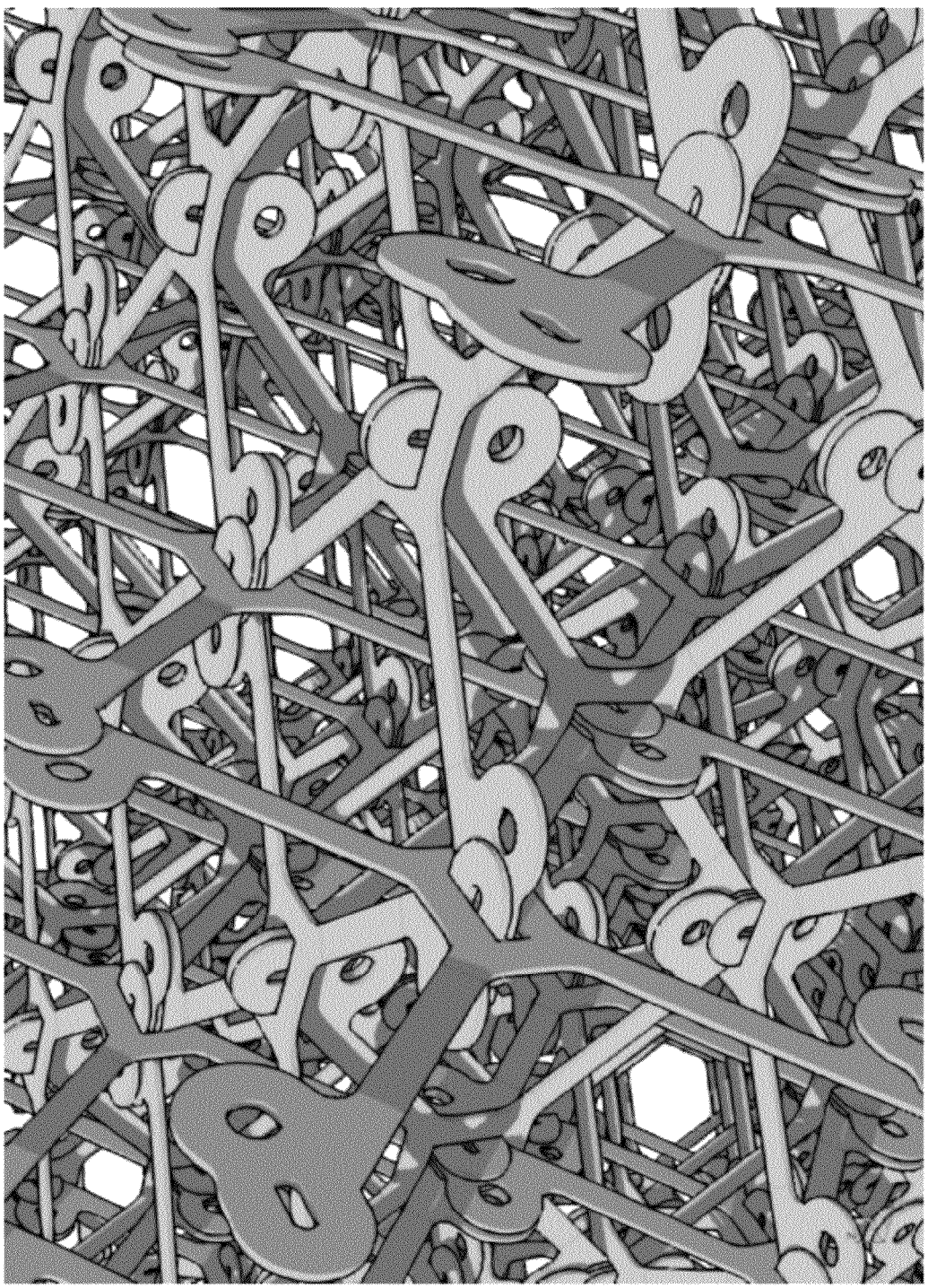

FIGS. 19A, 19B and 19C are normal views of crossbars after they have been assembled to form a volumetric structure.

FIGS. 19D, 19E, 19F and 19G are perspective views of crossbars after they have been assembled to form a volumetric structure.

Through mechanical property programming, as described above, the bulk properties of a digital composite material can progress from primarily compressive strength through tensegrity-like properties to primarily tensile strength. As such, related attributes, such as poisson ratio, can be programmed as well.

The topology of a Pinned Digital Composite Volume may be any volume filling meshing, with arbitrary node connectivity, as necessary to achieve desired range of configurations.

Interaction Potentials and Stress-Strain Curves

FIGS. 11A, 11B and 11C are interaction potential diagrams for (a) interaction between two neutral atoms or molecules, according to the Lennard-Jones model, (b) interaction between digital units with orthogonally pinned connections, and (c) interaction between digital units with pre-loaded snap-fit connections, respectively.

An important attribute in any interaction potential model is the potential well. The top-most horizontal potential limit line in the two graphs in FIGS. 11B and 11C indicates the designed limits of within-part ligaments. The potential level of the peak after the potential well in 11C represents a lower secondary limit for a snap-fit connection model, and indicates the designed disassembly strength of an in-band connection mechanism.

FIGS. 12A, 12B, 12C and 12D illustrate tunable multiphase elasticity. Specifically, these Figures are stress-strain diagrams of bulk material in different scenarios.

Figure 12D:
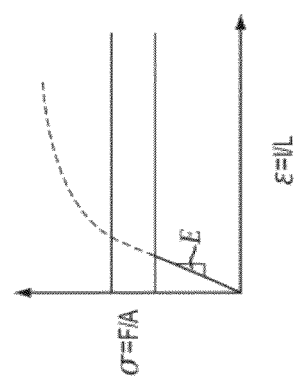

Connections may be designed such that the stress-strain ($\sigma/\epsilon$) curve of the connection ($\sigma(\epsilon)_c$) has a particular relationship to the $\sigma/\epsilon$ curve of the most elastic within-part ligament ($\sigma(\epsilon)_p$). If $\sigma(\epsilon)_c$ is always greater than or less than $\sigma(\epsilon)_p$, then the connection either does not contribute to, or dominates, respectively, the bulk material behavior of the digital material. The $\sigma/\epsilon$ curve of the bulk material will look typical, as in FIG. 12A. On the other hand, if $\sigma(\epsilon)_c$ intersects $\sigma(\epsilon)_p$, then the material will appear to have two phases of elasticity, such as in FIG. 12B. The first phase of elasticity is useful for low power distributed small actuator or large actuator (such as a cable winch) based morphing structures that still display high strength characteristics. Noting that a form of digital frangibility is a possibly useful property of digital materials, whereby the bulk structure disintegrates without exceeding the linear elastic limits of the individual parts, $\sigma/\epsilon$ curves for frangible digital materials are shown in FIGS. 12C and 12D, with a primary feature being the cutoff yield strength of the connections.

The use of many small parts to assemble a large part allows for the use of elastic averaging to reduce overall error. When many parts are used to locate a single feature, with enough elastic compliance to adjust to small inconsistencies in the location of the feature, the effective location of the feature will be the average of the individual constraints provided by the surrounding parts. This average location can be more precise than the process used to fabricate the individual parts. The original per-part error must be within a certain threshold for a given system. By the same rules, when forces are effectively distributed throughout an assembly of smaller parts, tolerances on strength requirements may be effectively reduced as the observed bulk strength of the assembly will be a result of this force distribution.

Benefits and Applications

In exemplary implementation of this invention, fabrication of structures from discrete parts is performed with discrete relative local positioning, instead of continuous variation of composition and location of material as in an analog fabrication system. Digital Composite units are made from anisotropic fiber reinforced composites, to enable low density, sparse structural systems. Advantageously, a chain of discrete fiber composite parts can be as strong as a monolithic part, and have advantages with manufacturing processes, serviceability, and reusability, in addition to tunability and extensibility.

Current industry leading fiber composite manufacturing processes require large investments in both time and infrastructure. In contrast, in exemplary implementations of this invention, tunable anisotropic characteristics of fiber reinforced composite construction can be maintained with the chaining of many discrete parts at high resolution. Since these parts may be self similar, and the macro scale constructions can vary arbitrarily (depending on part resolution), the benefits include vastly reducing time and expense for prototyping.

In exemplary implementations, digital material may be used for rapid prototyping and fabrication of any two-dimensional or three-dimensional shape with discretized resolution, from fiber reinforced composite material. This may be thought of as a kit of parts whose individual fiber layups and interconnectivity allows for tuned macro-assemblies. Therefore, the ability to engineer very specific mechanical material properties is maintained with this fabrication method, whereby functional material properties as well as overall shape are tuned via the strategy for assembly of the parts.

Many fields (e.g., architecture, aerospace, transport, science) have applications that call for strong, lightweight, reconfigurable and precisely shaped surfaces, ranging from many kilometers scale elevated light railway infrastructure to meter scale vehicle structures, to low inertia measurement devices with micron scale features. The present invention, in some implementations, has the ability to reconfigurably form tuned structures, making it a particularly valuable functional prototyping and manufacturing tool for these applications.

The commercial aerospace industry is moving towards aircraft designs that have fewer but larger monolithic fiber composite parts. Conventional manufacturing processes have scaled up, accordingly, which requires tools (for defining the shape of the part), and ovens (for polymer matrix curing) that are large enough to influence the size of the buildings that contain them. The present invention can solve this problem by digital assembly of sparse volumes comprised of many smaller components, so that all of the tooling required may be significantly smaller than the finished part.

The field of aerospace structural engineering seeks highly tuned and lightweight structural systems that need to meet extreme service, monitoring, and general environmental requirements. The expense involved with conventional manufacturing of composite aero-structures limits prototyping capabilities. In contrast, in exemplary implementations of this invention, a low number of types of simple discrete components can be assembled to large structures according to local-only rules, which makes them good candidates for trivial adaptation to various shapes at a large scale. In the present invention, digital material is additionally highly tunable in terms of its shape, density, and corresponding mechanical properties.

Commercially available in situ fiber reinforced polymer sensing and monitoring systems are very expensive, and many rely on custom designed schemes for embedding non structural components within parts. In contrast, in exemplary implementations of the present invention, custom systems can be assembled from standardized parts. Furthermore, according to principles of this invention, active or passive electronic circuits may be embedded in assembled structures, allowing the structure to store information that may be used for purposes ranging from passive monitoring to correcting overall shape.

In exemplary implementations of this invention, the assembly process confines the stochasticity of the material to the production of each part, and allows for highly porous large scale volumetric assemblies that can still contain components that are extrinsic to the structure, such as with aircraft structures.

In exemplary implementations, structures may be fabricated using massively parallel assembly of digital materials, including the assembly of structures larger than the assembly machinery. In addition, mobile units may later travel over the structure and replace damaged units or adapt the structure to new requirements.

Continuously shape morphing structures currently focus on traditional kinematics with flexural components accounting for continuous deformation and/or high density and high cost materials such as piezoelectric ceramics, shape memory alloys, and electroactive polymers. This has limited the size, degrees of freedom, and manufacturability of shape morphing structures to date.

In contrast, in exemplary implementations of this invention, digital materials allow for the design of materials with many small and inexpensive actuators that combine to deliver large displacements with large forces, and/or tunable elastic phases in a lattice geometry that allows for deformation with simple large scale actuation without compromising the strength of the assembly.

With progress in unmanned vehicle technology, experience has shown that rogue or poorly piloted vehicles represent a significant danger to people and property. This is particularly true of unmanned aerial vehicles, which pose a ballistic hazard to manned aircraft during normal operation. In some implementations of this invention, digital material may be assembled into aerostructures with precise failure modes, because of the tunability of the connections, so that a structure that is strong and light enough for flight can rapidly self-disassemble upon impact with another object.

SOME DEFINITIONS

As used herein:

A structure is "sparse" if at least 40% of the volume of the structure comprises voids, hollows or other empty space not occupied by solid matter.

A "crossbar" (or "crossbar unit") means a unit that includes four elongate elements.

Variants

This invention may be implemented in many different ways. Here are some non-limiting examples:

In some cases, at least some connections between units are not elastic. In some cases, units comprise composite materials that are not fiber-reinforced.

This invention may be implemented as a product comprising a set of discrete units assembled, or adapted to be assembled, into a sparse structure, wherein: (a) each unit comprises composite material, and (b) a majority of the units in the set are each reversibly connected, or adapted to be reversibly connected, to at least two other units in the set, by connections that are adapted to transfer forces between connected units. Furthermore: (1) the composite material may be reinforced with fibers, (2) the connections may be elastic, (3) at least some of the units in the set may be layered, and for each layered unit, the composite material may comprise multiple layers reinforced by fibers, each fiber having an orientation, the average orientation of the fibers in a layer defining an average fiber orientation for that that layer, and the average fiber orientation for at least some of the layers of that specific unit differing by more than 45 degrees from the average fiber orientation for at least some of the other layers of that specific unit, (4) at least one individual unit in the set may have one or more holes through it, include at least one elongate subelement that has at least a first and a second longitudinal end, include some fibers that extend from a first region that is at or adjacent to the first longitudinal end to a second region that is at or adjacent to the second longitudinal end, and include other fibers that are oriented in a loop around at least one of the one or more holes, (5) the connections between connected units may occur at certain positions on and relative to the connected units, and wherein, in response to loading of the sparse structure, a reversible deformation of a lattice in the sparse structure may occur, said reversible deformation being due at least in part to reversible change in at least some of said positions at which said connections occur, (6) the sparse structure may further comprise at least one actuator to elastically deform the structure, (7) at least some specific units in the set may be elongate and each of these specific units may transfer, or may be adapted to transfer, axial load along its long dimension to other units that are connected to, and aligned orthogonally to, said specific unit, (8) some of the units in the set may comprise elongated compression units, each of the compression units being adapted to elastically deform further, from its unloaded state, in response to compressive loading of a particular magnitude along its long dimension than to tension loading of the same magnitude along its long dimension, (9) some of the units in the set may comprise elongated tension units, each of the tension units being adapted to elastically deform further, from its unloaded state, in response to tension loading of a specified magnitude along its long dimension than to compressive loading of the same specified magnitude along its long dimension, (10) some of the particular units in the set may be elongate and these particular units may be elastically connected by snapping the longitudinal end of one unit, or the longitudinal ends of multiple units, into a notch in another unit, which notch has a chamfered edge, (11) the sparse structure may comprise nodes and elongate components, wherein each of the nodes is connected, or adapted to be connected, to three of the elongate components, in each case at a point of connection, which point of connection for any particular one of the elongate components is at or adjacent to a longitudinal end of that particular elongate component, each of the elongate components has a longitudinal axis along its long dimension, which longitudinal axis may be curved or may be straight, and the length of the longitudinal axis of each of elongate components is the same, (12) at least some of units in the set may be crossbar units, which crossbar units are reversibly connected, or adapted to be reversibly connected, by elastic connections, each of which elastic connections is formed by a compression clip clipping together longitudinal ends of five crossbar units, four of the five crossbar units being aligned in a plane that is orthogonal to the long dimension of the fifth of the five crossbar units, (13) the sparse structure may be adapted to disintegrate, without exceeding the elastic limits of the units in the structure, (14) a first subset of the units may differ, in chemical composition or material property, from a second subset of the units, (15), some of the units may include electrical conductors and others of the units may not include electrical conductors.

This invention may be implemented as an automated process of assembling a set of discrete units into a sparse structure, wherein (a) each unit comprises composite material, and (b) the automated process comprises reversibly connecting each of the units to at least one other of the units, by connections that are adapted to transfer forces between connected units. Furthermore: (1) some of the connections may be elastic connections that are created, for each respective connection, by pushing a unit against the sparse structure when the sparse structure is partially assembled, the push being given by an automated assembly device that moves with one degree of freedom, (2) the process may be controlled by a computer algorithm and the mechanical properties of the sparse structure produced by the process may be tuned by changing one or more of the following: (A) the ratio of different types of the units used to assemble the sparse structure, and (B) geometry of the sparse structure, and (3) due to elastic averaging, the automated process may assemble a sparse structure with a precision (with respect to variation in absolute physical dimensions) that exceeds the precision (with respect to variation in absolute physical dimensions) of the units that comprise the sparse structure.

CONCLUSION

It should be clear to a person skilled in the art that, for each of the examples described above, many physical variants are possible. Interconnect between units would vary appropriately.

In the preceding descriptions, numerous specific details are set forth in order to provide a thorough understanding of the invention. However, it will be understood by those skilled in the art that the present invention may be practiced without these specific details. In other instances, well known methods, procedures, and components have not been described in detail, so as not to obscure the present invention.

It is to be understood that the methods and apparatus which have been described above are merely illustrative applications of the principles of the invention. Numerous modifications may be made by those skilled in the art without departing from the scope of the invention. The scope of the invention is not to be limited except by the claims that follow.

What is claimed is:

1. A product comprising a set of discrete units assembled, or adapted to be assembled, into a sparse structure, wherein:
    each unit comprises composite material, and
    a majority of the units in the set are each reversibly connected, or are each reversibly connectible to at least two other units in the set, by connections that are flexural locking mechanisms, pinned locking mechanisms or compression clips.

2. The product of claim 1, wherein the composite material is reinforced with fibers.

3. The product of claim 2, wherein the connections are elastic.

4. The product of claim 1, wherein at least some of the units in the set are layered, and for each layered unit, the composite material comprises multiple layers reinforced by fibers, each fiber having an orientation, the average orientation of the fibers in a layer defining an average fiber orientation for that layer, and the average fiber orientation for at least some of the layers of that specific unit differing by more than 45 degrees from the average fiber orientation for at least some of the other layers of that specific unit.

5. The product of claim 1, wherein at least one individual unit in the set has one or more holes through it, includes at least one elongate subelement that has at least a first and a second longitudinal end, includes some fibers that extend from a first region that is at or adjacent to the first longitudinal end to a second region that is at or adjacent to the second longitudinal end, and includes other fibers that are oriented in a loop around at least one of the one or more holes.

6. The product of claim 1, wherein the connections between connected units occur at certain positions on and relative to the connected units, and wherein, in response to loading of the sparse structure, a reversible deformation of a lattice in the sparse structure occurs, said reversible deformation being due at least in part to reversible change in at least some of said positions at which said connections occur.

7. The product of claim 1, wherein the sparse structure further comprises at least one actuator to elastically deform the structure.

8. The product of claim 1, wherein at least some specific units in the set are elongate and each of these specific units transfer, or is adapted to transfer, axial load along its long dimension to other units that are connected to, and aligned orthogonally to, said specific unit.

9. The product of claim 1, wherein some of the units in the set comprise elongated compression units, each of the compression units being adapted to elastically deform further, from its unloaded state, in response to compressive loading of a particular magnitude along its long dimension than to tension loading of the same magnitude along its long dimension.

10. The product of claim 1, wherein some of the units in the set comprise elongated tension units, each of the tension units being adapted to elastically deform further, from its unloaded state, in response to tension loading of a specified magnitude along its long dimension than to compressive loading of the same specified magnitude along its long dimension.

11. The product of claim 1, wherein some of the particular units in the set are elongate and these particular units may be elastically connected by snapping the longitudinal end of one unit, or the longitudinal ends of multiple units, into a notch in another unit, which notch has a chamfered edge.

12. The product of claim 1, wherein the sparse structure comprises nodes and elongate components, each of the nodes is connected, or adapted to be connected, to three of the elongate components, in each case at a point of connection, which point of connection for any particular one of the elongate components is at or adjacent to a longitudinal end of that particular elongate component, each of the elongate components has a longitudinal axis along its long dimension, which longitudinal axis may be curved or may be straight, and the length of the longitudinal axis of each of elongate components is the same.

13. The product of claim 1, wherein at least some of units in the set are crossbar units, which crossbar units are reversibly connected, or adapted to be reversibly connected, by elastic connections, each of which elastic connections is formed by a compression clip clipping together longitudinal ends of five crossbar units, four of the five crossbar units being aligned in a plane that is orthogonal to the long dimension of the fifth of the five crossbar units.

14. The product of claim 1, wherein the sparse structure is adapted to disintegrate, without exceeding the elastic limits of the units in the structure.

15. The product of claim 1, wherein a first subset of the units differs, in chemical composition or material property, from a second subset of the units.

16. The product of claim 1, wherein some of the units include electrical conductors and others of the units do not include electrical conductors.

* * * * *